US010735810B2

(12) United States Patent
Gupta et al.

(10) Patent No.: US 10,735,810 B2
(45) Date of Patent: Aug. 4, 2020

(54) SYSTEM AND METHODS FOR DISAMBIGUATING AN AMBIGUOUS ENTITY IN A SEARCH QUERY BASED ON THE GAZE OF A USER

(71) Applicant: Rovi Guides, Inc., San Jose, CA (US)

(72) Inventors: Ajay Kumar Gupta, Andover, MA (US); William L. Thomas, Evergreen, CO (US); Mathew C. Burns, Dublin, CA (US); Gabriel C. Dalbec, Morgan Hill, CA (US); Alexander W. Liston, Menlo Park, CA (US); Jonathan A. Logan, Mountain View, CA (US); Margret B. Schmidt, Redwood City, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/168,947

(22) Filed: Oct. 24, 2018

(65) Prior Publication Data

US 2019/0132644 A1    May 2, 2019

Related U.S. Application Data

(63) Continuation of application No. 15/474,368, filed on Mar. 30, 2017, now Pat. No. 10,142,686.

(51) Int. Cl.
*H04N 21/442* (2011.01)
*G06F 3/16* (2006.01)
(Continued)

(52) U.S. Cl.
CPC ....... *H04N 21/44218* (2013.01); *G06F 3/013* (2013.01); *G06F 3/0482* (2013.01);
(Continued)

(58) Field of Classification Search
CPC ......... H04N 21/44218; H04N 21/4316; H04N 21/434; H04N 21/435; H04N 21/4532; H04N 21/47217; H04N 21/4858
See application file for complete search history.

(56) References Cited

U.S. PATENT DOCUMENTS

| 8,571,851 | B1 * | 10/2013 | Tickner | G06F 17/2785 |
| | | | | 704/1 |
| 2010/0174586 | A1 * | 7/2010 | Berg, Jr. | G06Q 30/02 |
| | | | | 705/7.32 |

(Continued)

*Primary Examiner* — Chenea Davis
(74) *Attorney, Agent, or Firm* — Haley Guiliano LLP

(57) ABSTRACT

Systems and methods for disambiguation of an ambiguous entity in a search query based on the gaze of a user. These systems and methods may be implemented by a media guidance application (e.g., executed by user equipment associated with the user). In some aspects, the media guidance application may monitor the gaze of the user and attempt to disambiguate the ambiguous entity based on an area of the screen the user viewed while issuing the search query. If the media guidance application receives an indication that it did not disambiguate the ambiguous entity in the search query correctly, the media guidance application may increase the area of the screen that the user viewed in order to find an additional entity. This may allow the media guidance application to quickly and accurately find the correct answer to the user's search query.

20 Claims, 10 Drawing Sheets

(51) Int. Cl.
*G06F 3/01* (2006.01)
*G06F 3/0482* (2013.01)
*H04N 21/475* (2011.01)
*H04N 21/482* (2011.01)
*H04N 21/431* (2011.01)
*H04N 21/434* (2011.01)
*H04N 21/435* (2011.01)
*H04N 21/45* (2011.01)
*H04N 21/472* (2011.01)
*H04N 21/485* (2011.01)
*H04N 21/422* (2011.01)

(52) U.S. Cl.
CPC ........... *G06F 3/167* (2013.01); *H04N 21/434* (2013.01); *H04N 21/435* (2013.01); *H04N 21/4316* (2013.01); *H04N 21/4532* (2013.01); *H04N 21/4755* (2013.01); *H04N 21/47217* (2013.01); *H04N 21/4828* (2013.01); *H04N 21/4858* (2013.01); *H04N 21/42203* (2013.01)

(56) References Cited

U.S. PATENT DOCUMENTS

| | | | | |
|---|---|---|---|---|
| 2014/0344017 | A1* | 11/2014 | Deephanphongs | G06K 9/00362 705/7.29 |
| 2015/0356971 | A1* | 12/2015 | Stolcke | H04N 7/183 704/231 |
| 2016/0028878 | A1* | 1/2016 | Davis | H04M 1/72569 704/275 |
| 2016/0170710 | A1* | 6/2016 | Kim | G06F 3/167 704/275 |

* cited by examiner

SYSTEM AND METHODS FOR DISAMBIGUATING AN AMBIGUOUS ENTITY IN A SEARCH QUERY BASED ON THE GAZE OF A USER

CROSS-REFERENCE TO RELATED APPLICATIONS

This application is a continuation of U.S. patent application Ser. No. 15/474,368, filed Mar. 30, 2017, currently allowed, the disclosure of which is hereby incorporated by reference herein in its entirety.

BACKGROUND

Conversational systems have become increasing common in households around the globe. With the increased prevalence of these systems, users have become increasingly dependent on the conversational systems. As such, users commonly defer to the conversational system to answer questions that they may have previously been resolved using an Internet search, e.g., the identity of actors in a media asset. The increased comfort with these systems may lead to poorly phrased and increasingly vague questions. For example, the user may substitute pronouns in their sentences or simply query the system for the identity of the unknown actor currently in the media asset by asking "who is that?" In some instances, these questions may be too vague for the conversational system to accurately interpret, requiring the user to further clarify their inquiry or requiring that the conversational system attempt to the answer with little to no information. Such conventional systems do not consider where the user was looking at the time or some time preceding when they asked the question.

SUMMARY

Accordingly, systems and methods are described herein for disambiguation of an ambiguous entity in a search query based on the gaze of a user. These systems and methods may be implemented by a media guidance application (e.g., executed by user equipment associated with the user). In some aspects, the media guidance application may monitor the gaze of the user and attempt to disambiguate the ambiguous entity based on an area of the screen the user viewed while issuing the search query. If the media guidance application receives an indication that it did not disambiguate the ambiguous entity in the search query correctly, the media guidance application may increase the area of the screen that the user viewed in order to find an additional entity. This may allow the media guidance application to quickly and accurately find the correct answer to the user's search query.

For example, a user may be watching a media asset (e.g., episode 9 of season 1 of "Game of Thrones," entitled "Baelor") and may want to know how old is an actor (e.g., Jack Gleeson) who plays one of the characters (e.g., Joffrey Baratheon) in the media asset. The user may ask "How old is he?" when Joffrey Baratheon is present in a scene. Based on determining that the area of the screen corresponding to the gaze of the user contains Ned Stark, played by Sean Bean, the media guidance application may answer with "Did you a mean Sean Bean?" Upon the user responding "No," the media guidance application may increase the area of the screen corresponding to the gaze of the user: if the increased area includes Joffrey Baratheon, the media guidance application may answer with "Did you mean Jack Gleeson?" In this way, the media guidance application may quickly identify and disambiguate the ambiguous entity included in the user's search request, without having to guess every entity in the frame.

The media guidance application may monitor the gaze of the user during playback of "Baelor." The media guidance application may determine an area of the screen that the user is looking at continuously, at predetermined intervals, randomly, or during any other suitable time frame. The media guidance application may store, in a user profile associated with the first user, data indicating what area the user was looking at each time the media guidance application monitored the gaze of the user. For example, at 6:50 PM, the media guidance application may determine a first area of the screen that corresponds to the user's gaze at 6:50 PM. The media guidance application may determine that the frame being generated for display at 6:50 PM was the frame at the fiftieth minute of "Baelor." The media guidance application may compare the first area to the metadata associated with the frame at the fiftieth minute of "Baelor" to determine that the user was looking at Ned Stark, played by Sean Bean. The media guidance application may store, in the user profile, indications of the time (e.g., 6:50 PM), the frame (e.g., the frame at the fiftieth minute of "Baelor), and the entity (e.g., Sean Bean) that the user viewed at 6:50 PM. The media guidance application may also store a weighting profile in the user profile, which indicates how important an entity is (or how often the user looks at said entity).

At a second time after the first time (e.g., 6:52 PM), the media guidance application may determine a second area that corresponds to the gaze of the user at that time. The media guidance application may also detect that a user says "How old is he?" and may then determine that the use of the pronoun "he" in the question indicates that the question includes an ambiguous entity. In response, the media guidance application may seek to narrow the possible entities that correspond to the ambiguous entity in the question. To do so, the media guidance application may determine a frame that corresponds to the current time at which the question was asked, which may be the frame occurring at the fifty-second minute of "Baelor." Once the frame is identified, the media guidance application may retrieve metadata about that frame, such as the location of a first entity (e.g., Ned Stark played by Sean Bean), second entity (e.g., Joffrey Baratheon played by Jack Gleeson), and a third entity (e.g., Cersei Lannister played by Lena Headey) in the frame. Note that entities may be actors, actresses, objects, or characters, or any other suitable entity in a frame.

The media guidance application may then determine whether the second area overlaps with any of the locations of the first entity, the second entity, or the third entity. For example, the media guidance application may determine that the second area overlaps with only the first entity. If this is the case, the media guidance application may generate for display to the user a prompt that says "Did you mean Sean Bean?"

However, the second area may overlap with, for example, the first and third entities. The media guidance application may then determine which entity to prompt the user with. For example, the media guidance application may determine, from the weighting profile stored in the user profile, that Sean Bean has a greater weight than Lena Headey, which may indicate that the user has viewed Sean Bean more often than the user has viewed Lena Headey. As a result, the media guidance application may ask the user if he or she meant Sean Bean. Additionally or alternatively, the media guidance application may access a social media popularity of Sean Bean and Lena Headey, and based on the information therein, determine that, for example, Sean Bean is more popular, and thus ask the user if he or she meant Sean Bean. Additionally or alternatively, the media guidance application may use the gaze of other users who are also viewing "Baelor" to determine whether to prompt the user with the first entity or the third entity. For example, if another user was looking at Sean Bean at the current time the question was posed, the media guidance application may, as a result, ask the user if he or she meant Sean Bean. Additionally or alternatively, the media guidance application may use a knowledge graph to determine that the pronoun only applies to one of the first entity and the third entity. For example, because the pronoun "he" in the question indicates that the user is referring a male, the media guidance application may ask the user if he or she meant Sean Bean, because Sean Bean is male and Lena Headey is female.

The media guidance application may then receive the user's response to the inquiry. For example, the user may then respond "no" or "the other one" to the media guidance application's prompt "Did you mean Sean Bean?" In response, the media guidance application may attempt to determine another entity that may disambiguate the search query and adjust the user profile. For example, in order to determine another entity, if the third entity was in the second area, the media guidance application may prompt the user with the third entity. However, assuming that the third entity was not in the second area, the media guidance application may expand the second area, and determine that, for example, the second entity (e.g., Joffrey Baratheon played by Jack Gleeson) is in the expanded second area. Additionally, the media guidance application may access previously stored data about the users gaze and further analyze that data to edit the user profile. For example, the media guidance application may access the information stored at 6:50 PM, that is, that the user was looking at Sean Bean in the frame at the fiftieth minute of "Baelor." The media guidance application may expand the first area (i.e., the area that corresponded to the user's gaze at 6:50 PM) to determine that the expanded first area overlaps with the third entity. Because the system has not yet determined whether the user was looking at the second entity (e.g., Joffrey Baratheon played by Jack Gleeson) or the third entity (e.g., Cersei Lannister played by Lena Headey), the media guidance application may decrease the weight of Sean Bean in the weighting profile, as the user was definitely not looking at Sean Bean, and increase the weight of Lena Headey and Jack Gleeson equally.

If the media guidance application determines that Jack Gleeson is in the expanded second area of the fifty-second frame of "Baelor," the media guidance application may issue the audio prompt "Did you mean Jack Gleeson?" If the user answers "yes" to the media guidance application's prompt, the media guidance application may then determine the answer to the user's question, provide additional information about the second entity, and edit the user profile. For example, the media guidance application may answer the question "How old is he?" by saying or generating for display "24." Furthermore, the media guidance application may display a listing for the show "Killinskully" or the movie "Batman Begins," both of which contain Jack Gleeson, biographical information about Jack Gleeson, or any other appropriate information about Jack Gleeson. Finally, the media guidance application may adjust the weighting profile in the user profile of the user by decreasing the weight of Sean Bean (because the media guidance application now knows that the user was not looking at Sean Bean) and increase the weight of Jack Gleeson.

In some aspects, the media guidance application may monitor, at a current time, a gaze of the user during playback of a media asset. For example, the media guidance application may monitor the gaze of the user during playback of "Baelor." In some embodiments, the media guidance application may determine a first area of the display screen that corresponds to the gaze. For example, the media guidance application may determine that the user was looking at a one inch by one inch portion of the upper left corner of the screen. The media guidance application may receive, at the current time, from the user, a search query including an ambiguous entity. For example, the media guidance application may receive a user search query of "How old is he?"

The media guidance application may determine a frame of the media asset that corresponds to the current time, and determine that the first area overlaps with a location of a first entity in the frame. For example, the one inch by one-inch portion may overlap with the position of Sean Bean's character in "Baelor," Ned Stark. Based on determining that the first area overlaps with the location of the first entity, the media guidance application may generate for display a first prompt for additional input. The first prompt for additional input may indicate the first entity as a first potential disambiguation of the ambiguous entity in the search query. For example, the media guidance application may generate for display the prompt "Did you mean Sean Bean?" Subsequent to generating for display the first prompt for additional input, the media guidance application may receive a negative input from the user. The negative input may indicate that the first entity is an incorrect disambiguation of the ambiguous entity in the search query. For example, the user may say "No, the other one."

Based on receiving the negative input, the media guidance application may expand the first area to a second area, larger than the first area, of the display screen. For example, the media guidance application may expand the one inch by one inch square to a three inch by three inch square. The media guidance application may determine that the second area overlaps with a location of a second entity in the frame. For example, the media guidance application may determine that the three inch by three inch square overlaps with the location of Jack Gleeson's character in "Baelor," Joffrey Baratheon. Based on determining that the second area overlaps with the location of the second entity, the media guidance application may generate for display a second prompt for additional input. The second prompt for additional input may indicate the second entity as a second potential disambiguation of the ambiguous entity in the search query. For example, the media guidance application may generate for display the prompt "Did you mean Jack Gleeson."

In some aspects, the media guidance application may monitor, using control circuitry, a gaze of a user during playback of a media asset. The media guidance application may monitor the gaze of the user by monitoring a vertical degree of an eye of the user, a horizontal degree of the eye of the user, and a position of the eye of the user relative to a display screen. For example, the media guidance application may use a detector, such as a camera, an infrared detector, contact lens detector, wearable camera, wearable technology, optical sensor, augmented reality glasses, or any other suitable detector, to determine that the eye of the user is six feet from a television playing "Baelor," and that the eye of the user is aligned with the center of the screen at 6:52 PM. The media guidance application may further use the detector to determine that the eye of the user is at a horizontal angle of 8 degrees to the left of center and that the eye of the user is at a vertical angle of 5 degrees above center. In some embodiments, the media guidance application may determine a size of the display screen displaying the media asset. For example, the media guidance application may determine that the display screen displaying "Baelor" is a 42 inch television, and has dimensions of 20.6 inches by 36.6 inches.

In some embodiments, the media guidance application may determine a first area of the display screen corresponding to the gaze of the user. In some embodiments, the media guidance application may assume that the first area is defined as a circle centered on the point corresponding to the gaze of the user, or about 10 inches left of the center of the television and 6 inches above the center of the television. The circle may be any suitable radius, for example, three inches. In other embodiments, the media guidance application may determine a plurality of horizontal and vertical angles at which the user's eyes paused or changed directions (i.e., fixation points), and use those points to define the edges or vertices of the outer bound of the first area. In some embodiments, the media guidance application may store, in a memory, a data structure indicating the first area and the current time.

In some embodiments, the media guidance application may receive, using the control circuitry, a search query from the user at the current time. For example, the media guidance application may determine that the user said "How old is he?" using a microphone at 6:52 PM. In some embodiments, the media guidance application may determine that the search query includes an ambiguous entity. For example, the media guidance application may determine that the word "he" is a pronoun that refers to a human or animal entity by referencing a database of pronouns. The media guidance application may thus determine that the pronoun "he" in the search query "How old is he?" refers to an ambiguous entity.

In some embodiments, the media guidance application may, based on determining that the search query includes the ambiguous entity, retrieve, from the memory, the data structure indicating the first area and the current time. In some embodiments, the media guidance application may determine a frame of the media asset that corresponds to the current time. For example, the media guidance may extract, by executing an SQL script utilizing the declarative "Select" command, the current time from the data structure. The media guidance application may then retrieve a viewing log, the viewing log indicating the user's interactions with "Baelor." The viewing log may indicate that the user started watching "Baelor" at 6:00 PM and has not stopped or paused "Baelor" since. The media guidance application may determine that 6:52 PM corresponds to the frame occurring at the fifty-second minute of "Baelor" based on the viewing log.

In some embodiments, the media guidance application may retrieve, from a database, metadata relating to the frame of the media asset that corresponds to the current time. The metadata may include a first location of a first entity in the frame and a second location of a second entity in the frame. For example, the media guidance application may transmit a signal, to the database, requesting the metadata relating to the frame occurring at the fifty-second minute of "Baelor" and receive the metadata in return. The metadata may include the location of the Sean Bean (i.e., the first entity) in the frame occurring at the fifty-second minute of "Baelor" and the location of Jack Gleeson (i.e., the second entity) in the same frame. In some embodiments, the first entity and the second entity may be at least one of an actor, an actress, an object, an animal, and a character. The metadata may indicate the first location of the first entity in the frame in any suitable manner. For example, the metadata may use a bounding box to define the location of the first entity, where the top left corner of the bounding box and the bottom right corner of the bounding box are defined in x-y coordinates, x being the horizontal displacement, in pixels, from the center of the frame and y being the vertical displacement, in pixels, from the center of the frame. Any suitable coordinate system could be used (e.g., displacement from the top left corner of the screen). Furthermore, any suitable definition for the first location of the first user may be used (e.g., the complete boundary of the first entity may be the first location or every pixel that makes up the first entity may be the first location) in the metadata as the first location of the first entity. In some embodiments, the media guidance application may translate these coordinates to determine the first location of the first entity and the second location of the second entity on the display screen in a similar manner.

In some embodiments, the media guidance application may extract, by executing an SQL script utilizing the declarative "Select" command, from the data structure, the first area corresponding to the current time. For example, the media guidance application may determine that the first area is the area outlined by a circle with a radius of three inches centered at 10 inches left of center and 6 inches above center of the display screen. In some embodiments, the media guidance application may extract, by executing an SQL script utilizing the declarative "Select" command, from the metadata, the first location of the first entity in the frame. For example, the media guidance application may determine that the location of Sean Bean in the frame may be defined by a bounding box, the upper left corner of the bounding box at 10 inches left of center and 9 inches above center, and the lower right corner of the bounding box at 7 inches left of center and 5 inches above center.

In some embodiments, the media guidance application may determine that the first area overlaps with the first location of the first entity in the frame. For example, the media guidance application may determine that both the first area and the location of Sean Bean encompass the same point or that their boundaries intersect. In response, the media guidance application may determine that the first area and the location of Sean Bean overlap.

In some embodiments, the media guidance application may determine that the first area overlaps with only the first location of the first entity in the frame. In these embodiments, based on determining that the first area overlaps with the first location of the first entity in the frame, the media guidance application may generate for display a first prompt for additional input. The first prompt for additional input indicates that the first entity as a first potential disambiguation of the ambiguous entity in the search query. For example, the media guidance application may generate for display the first prompt for additional input by generating for display a text box containing "Did you mean Sean Bean?" In some embodiments, instead of generating for display the first prompt for additional input, the media guidance application may issue the first prompt for additional input verbally by issuing "Did you mean Sean Bean?" verbally. In some embodiments, the media guidance application may cause a mobile device of the user to issue the first prompt visually or verbally. The media guidance application may communicate the first prompt for additional input to the user in any suitable manner.

In some embodiments, the media guidance application may determine that the first area overlaps with additional locations of additional entities. In some embodiments, the metadata may further include a third location of a third entity in the frame, and the media guidance application may extract, by executing an SQL script utilizing the declarative "Select" command, from the metadata, the third location of the third entity in the frame. For example, the media guidance data may determine the location of Lena Headey in the frame at the fifty-second minute of "Baelor" based on the extracting the location of Lena Headey from the metadata. In some embodiments, the media guidance application may determine that the first area overlaps with the third location of the third entity. For example, the media guidance application may determine that the first area overlaps with the location of Lena Headey in a manner similar to as described above with respect to determine that the first area overlaps with the first location of the first entity.

In some embodiments, the media guidance application, based on determining that the first area overlaps with the third location of the third entity and the first location of the first entity, may proceed to gather additional data concerning the first entity and the third entity to choose one of the entities to indicate in the first prompt for additional input as a potential disambiguation of the ambiguous entity in the search result.

In some embodiments, the media guidance application may gather additional data by retrieving, from the database, a user profile of the user. For example, the user profile of the user may indicate that the user liked "Ned Stark" (the character played by Sean Bean) on social media. In some embodiments, the media guidance application may generate for display the first prompt for additional input by generating for display a text box containing "Did you mean Sean Bean?" based on the user profile of the user. For example, the media guidance application may choose Sean Bean as the first potential disambiguation of the ambiguous entity because the user liked his character in "Baelor," "Ned Stark," on social media and did not like "Cersei Lannister," Lena Headey's character in "Baelor."

In some embodiments, the media guidance application may gather additional data by retrieving, from the database, an indication of a social media popularity of the first entity and a social media popularity of the third entity. For example, the media guidance application may receive an indication that Sean Bean has 2 million likes on social media, and Lena Headey has 1 million likes on social media. In some embodiments, the media guidance application may generate for display the first prompt for additional input by generating for display a text box containing "Did you mean Sean Bean?" based on the indication. For example, the media guidance application may choose Sean Bean as the first potential disambiguation of the ambiguous entity because he has more likes on social media than does Lena Headey.

In some embodiments, the media guidance application may gather additional data by receiving, from the database, a knowledge graph. In some embodiments, the media guidance application may determine that the search query includes a pronoun. For example, the media guidance application may determine that the search query contains the pronoun "he." In some embodiments, the media guidance application may retrieve, using the control circuitry, from the database, metadata associating the pronoun with a characteristic of a characteristic type. For example, "he" may be associated with the characteristic "male" of the characteristic type "gender." In some embodiments, the media guidance application may retrieve, from the database, metadata about the first entity and metadata about the second entity. In some embodiments, the media guidance application may determine, based on the metadata about the first entity and metadata about the second entity, that the first entity is associated with the characteristic and the third entity is associated with a different characteristic of the characteristic type. For example, the media guidance application may determine that Sean Bean is associated with the characteristic "male," but that Lena Headey is associated with the characteristic "female" in the "gender" characteristic type. In some embodiments, the media guidance application may generate for display the first prompt for additional input by generating for display a text box containing "Did you mean Sean Bean?" based on determining that the first entity is associated with the characteristic and the third entity is associated with a different characteristic of the characteristic type. For example, the media guidance application may choose Sean Bean as the first potential disambiguation of the ambiguous entity because "he" refers to "males," and Sean Bean is a male and Lena Headey is a female.

In some embodiments, the media guidance application may gather additional data by receiving, using the control circuitry, data indicative of a third area, calculated based on a gaze of the second user at the current time, from a user device of a second user. For example, the user may be watching "Baelor" with his girlfriend. The media guidance application may receive data indicating that the user's girlfriend was looking at a third area that was calculated based on a gaze of the girlfriend at 6:52 PM. The third area may be calculated in a similar manner as described about in relation to calculating the first area. In some embodiments, the media guidance application may determine that the third area overlaps with the location of the first entity. The media guidance application may determine that the third area overlaps with the location of the first entity in a similar manner as described above in relation to determining that the first area overlaps with the location of the first entity. In some embodiments, the media guidance application may generate for display the first prompt for additional input by generating for display a text box containing "Did you mean Sean Bean?" based on determining that the third area overlaps with the location of the first entity. That is, if the girlfriend of the user was also looking at Sean Bean, the media guidance application may determine that it is more likely that the user was looking at Sean Bean.

In some embodiments, the media guidance application may gather additional data by receiving, using the control circuitry, a weighting profile from a user profile for the user.

In some embodiments, the media guidance application may create the user profile for the user by monitoring the gaze of the user at a prior time before the current time. For example, the media guidance application may monitor the gaze of the user at 6:50 PM while the user is watching "Baelor" in a manner similar to as described above in relation to monitoring the gaze of the user at the current time (6:52 PM). In some embodiments, the media guidance application may store, in the user profile, a data structure indicating an area of the screen corresponding to the gaze of the user at the prior time. For example, the data structure may indicate the area of the screen corresponding to the gaze of the user at the prior time and 6:50 PM. In some embodiments, the media guidance application may determine, a second frame of the media asset corresponding to the prior time. For example, the media guidance application may determine that the second frame is the frame occurring at the fiftieth minute of "Baelor" in a similar manner as described in relation to determining the frame corresponding to the current time.

In some embodiments, the media guidance application may retrieve, from a database, metadata relating to the second frame of the media asset, the metadata relating to the second frame indicating a location of the first entity and a location of a third entity in the frame corresponding to the prior time. For example, the media guidance application may retrieve the metadata relating to the frame at the fiftieth minute of "Baelor" in a similar manner as described above in relation to retrieving the metadata relating to the fifty-second minute of "Baelor." The metadata relating to the frame at the fiftieth minute of "Baelor" may indicate the location of Sean Bean and may indicate the location of Lena Headey in the frame at the fiftieth minute of "Baelor." In some embodiments, the media guidance application may determine that the third area overlaps with the location of the first entity in the frame corresponding to the prior time. For example, the media guidance application may determine that the third area overlaps with the location of Sean Bean in the frame at the fiftieth minute of "Baelor" in a similar manner as described above in relation to determining that the first area overlaps with the first location of the first entity in the frame corresponding to the current time.

In some embodiments, the media guidance application, based on determining that the third area overlaps with the location of the first entity in the frame corresponding to the prior time, may store, in the user profile, a data structure indicating the first entity, the frame corresponding to the prior time, and the third area. For example, the media guidance application may store a data structure indicating Sean Bean, the frame at the fiftieth minute of "Baelor," and the third area in the user profile. In some embodiments, the media guidance application may further store, in the user profile, the weighting profile. The weighting profile may assign a first weight to the first entity, a second weight to the second entity, and a third weight to the third entity. For example, the media guidance application may store a weighting profile indicating that Sean Bean is assigned a weight of 40%, Jack Gleeson is assigned a weight of 30%, and Lena Headey is assigned a weight of 30%, based on the third area overlapping with the location of Sean Bean in the frame at the fiftieth minute of "Baelor." The weighting profile may indicate, for example, how often a user has viewed each of the entities.

In some embodiments, when the media guidance application receives the weighting profile from the user profile of the user, the media guidance application may extract, from the weighting profile, the first weight and the third weight, based on determining that the first area overlaps with the third location of the third entity and the first location of the first entity in the frame corresponding to the current time. For example, the media guidance application may extract, by executing an SQL script utilizing the declarative "Select" command, the weight of 40% for Sean Bean and the weight of 30% for Lena Headey based on determining that the first area overlaps with the location of Sean Bean and the location of Lena Headey in the frame at the fifty-second minute of "Baelor." In some embodiments, the media guidance application may determine that the first weight is greater than the third weight. In some embodiments, the media guidance application may generate for display the first prompt for additional input by generating for display a text box containing "Did you mean Sean Bean?" based on determining that the first weight is greater than the third weight. The media guidance application may determine that the user viewed Sean Bean more often than Lena Headey by determining that the weight of 40% for Sean Bean is greater than the weight of 30% for Lena Headey, and thus chose Sean Bean as the first potential disambiguation of the ambiguous entity.

In some embodiments, the media guidance application may additionally store, in the user profile, a data structure indicating a plurality of entities that correspond to the gaze of the user at a plurality of times. In some embodiments, the media guidance application may continuously monitor the gaze of the user at the plurality of times. The media guidance application may compare the monitored gaze of the user with metadata relating to each frame corresponding to the plurality of times at which the media guidance application monitored the gaze of the user in a manner similar to as described above in relation to determining that the first area overlaps with the first location of the first entity in the frame. In some embodiments, the media guidance application may add each entity that corresponds to the gaze of the user at the plurality of times to the data structure. The media guidance application may store, in the user profile, the data structure containing each entity. For example, at a time prior to the current time, the media guidance application may determine that the user looked at Sean Bean, and add "Sean Bean" to the data structure.

In some embodiments, the media guidance application may retrieve, from the user profile, the data structure indicating the plurality of entities that correspond to the gaze of the user at a plurality of times based on determining that the first area overlaps with the third location of the third entity and the first location of the first entity in the frame corresponding to the current time. The media guidance application may compare the first entity and the third entity to the data structure indicating the plurality of entities to determine that the first entity is in the data structure indicating the plurality of entities and that the third entity is not in the data structure indicating the plurality of entities. For example, the media guidance application may extract, by executing an SQL script utilizing the declarative "Select" command, the plurality of entities based on determining that the first area overlaps with the location of Sean Bean and the location of Lena Headey in the frame at the fifty-second minute of "Baelor." The media guidance application may determine that Sean Bean is in the plurality of entities, and that Lena Headey is not. In some embodiments, the media guidance application may generate for display the first prompt for additional input by generating for display a text box containing "Did you mean Sean Bean?" based on determining that the first entity is in the data structure indicating the plurality of entities and that the third entity is not in the data structure indicating the plurality of entities.

In some embodiments, the media guidance application may receive a negative input from the user subsequent to generating for display, or verbally issuing, the first prompt for additional input. The negative input may indicate that the first entity is an incorrect disambiguation of the ambiguous entity in the search question. For example, after the media guidance application generates for display the text box containing "Did you mean Sean Bean?", the user may say "No." or "No, the other one." to indicate that the user was not asking about the age of Sean Bean. In some embodiments, if the third entity was also in the first area, the media guidance application may also generate a prompt indicating the third entity as a potential disambiguation of the ambiguous entity.

In some embodiments, based on receiving the negative input, the media guidance application may attempt to find additional entities that may disambiguate the ambiguous entity in the search query.

In some embodiments, in order to find additional entities that may disambiguate the ambiguous entity in the search query, the media guidance application may expand the first area to a second area of the display screen, the second area being larger than the first area. For example, the media guidance application may expand the first area, a circle centered at 10 inches left of center and 6 inches above center with a radius of 3 inches, to a second area, a circle centered at 10 inches left of center and 6 inches above center with a radius of 6 inches.

In some embodiments, the media guidance application may extract, from the metadata, the second location of the second entity in the frame corresponding to the current time. For example, the media guidance application may extract, by executing an SQL script utilizing the declarative "Select" command, the second location of the second entity in the frame, and determine that the second location of the second entity is Jack Gleeson in the frame may be defined by a bounding box, the upper left corner of the bounding box at 5 inches left of center and 7 inches above center, and the lower right corner of the bounding box at 2 inches left of center and 3 inches above center. In some embodiments, the media guidance application may determine that the second area overlaps with the second location of the second entity. The media guidance application may determine that the second area overlaps with the second location of the second entity in a similar manner as described above in relation to determining that the first area overlaps with the first location of the first entity.

In some embodiments, based on determining that the second area overlaps with the second location of the second entity in the frame, the media guidance application may generate for display a second prompt for additional input. The second prompt for additional input indicates the second entity as a second potential disambiguation of the ambiguous entity in the search query. For example, the media guidance application may generate for display the second prompt for additional input by generating for display a text box containing "Did you mean Jack Gleeson?" In some embodiments, instead of generating for display the second prompt for additional input, the media guidance application may issue the second prompt for additional input verbally by issuing "Did you mean Jack Gleeson?" verbally.

In some embodiments, in addition to the media guidance application attempting to find additional entities that may disambiguate the ambiguous entity in the search query, the media guidance application may update the user profile based on the negative input. For example, the media guidance application, based on receiving the negative input from the user (e.g., the user saying "No." subsequent to the media guidance application generating for display the text box containing "Did you mean Sean Bean?"), the media guidance application may retrieve the data structure indicating the first entity, the frame corresponding to the prior time, and the third area. For example, the media guidance application may retrieve the data structure indicating Sean Bean, the frame at the fiftieth minute of "Baelor," and the third area from the user profile. In some embodiments, the media guidance application may retrieve, based on the third data structure, the metadata relating to the frame corresponding to the prior time. For example, the media guidance application may retrieve the metadata relating to the frame at the fiftieth minute of "Baelor" that indicates the location of Sean Bean and the location of Lena Headey in the frame at the fiftieth minute of "Baelor."

In some embodiments, the media guidance application may extract, from the third data structure, the third area. For example, the media guidance application, may extract, by executing an SQL script utilizing the declarative "Select" command, the third area from the data structure indicating Sean Bean, the frame at the fiftieth minute of "Baelor," and the third area. In some embodiments, the media guidance application may expand the third area to a fourth area of the display screen, the fourth area being larger than the third area. For example, the media guidance may expand the third area to a fourth area in a similar manner as described above in relation to expanding the first area to the second area. In some embodiments, the media guidance application may extract the fourth location of the third entity from the metadata relating to the frame corresponding to the prior time. For example, the media guidance application may extract the location of Lena Headey from the metadata relating to the frame at the fiftieth minute of "Baelor."

In some embodiments, the media guidance application may determine that the fourth area overlaps with the location of the third entity in the frame corresponding to the prior time. For example, the media guidance application may determine that the fourth area overlaps with the location of Lena Headey in the frame at the fiftieth minute of "Baelor." The media guidance application may do so in a manner similar to as described above in relation to determining that the first area overlaps with the first location of the first entity.

In some embodiments, the media guidance application may, based on determining that the fourth area overlaps with the location of the third entity in the frame corresponding to the prior time and that the second area overlaps with the second location of the second entity, decrease the first weight in the weighting profile by a first amount, increase the second weight by a second amount, and increase the third weight by the second amount. For example, the media guidance application may decrease the weight for Sean Bean from 40% to 30% as the media guidance application determined, based on the negative response, that the user was not looking at Sean Bean, and increase the weights for Jack Gleeson and Lena Headey from 30% to 35%.

In some embodiments, the media guidance application may receive, subsequent to generating for display the second prompt for additional input, an affirmative input from the user. The affirmative input may indicate that the second entity is a correct disambiguation of the ambiguous entity in the search query. For example, the media guidance application may, after the media guidance application generates for display the second prompt for additional input (i.e., the text box containing "Did you mean Jack Gleeson?"), detect the user saying "Yes!" In some embodiments, the media guidance application may update the user profile and gather additional information about the disambiguated entity based on the affirmative input.

In some embodiments, to update the user profile, the media guidance application may, based on receiving the affirmative input, decrease the first weight by an amount and increase the second weight by the amount. For example, the media guidance application may decrease the weight assigned to Sean Bean from 40% to 30%, as the media guidance application now knows that the user was not looking at Sean Bean, and increase the weight assigned to Jack Gleeson from 30% to 40%. The media guidance application may not adjust the weight assigned to Lena Headey because the media guidance application has received no additional information about Lena Headey from the conversation with the user.

In some embodiments, the media guidance application may gather and generate for display additional information relating to the second entity based on receiving the affirmative input. In some embodiments, the media guidance application may gather additional information by searching, based on receiving the affirmative input, the database for media content that includes the second entity. For example, the media guidance application may search a database for metadata tags on media content indicating that Jack Gleeson was an actor in the media content. In some embodiments, the media guidance application may generate for display listing for the media content that includes the second entity. For example, the media guidance application may determine that Jack Gleeson acted in the "Killinskully" series, in "Batman Begins" and in "All Good Children." The media guidance application may generate for display listings for the "Killinskully" series or for only episodes of the "Killinskully" series that contain Jack Gleeson, for "Batman Begins" and for "All Good Children." The media guidance application may allow the user to select the listings and access the media content.

The described systems and methods can disambiguate an ambiguous entity in a search query based on an adaptive system using the gaze of a user who put forth the search query. Conventional systems, while using the gaze of the user, determined a number of objects corresponding to the gaze of the user, and if none of these objects were the correct disambiguation of the ambiguous entity, could not adapt in an attempt to find potential additional objects that could disambiguate the ambiguous entity. This could leave the user without an answer to his or her search query or leave the conventional system to simply guess at the correct answer, likely frustrating the user. The past conventional systems did not appreciate increasing the search area to include objects or entities that were not necessarily directly in the line of sight of the user. The described systems and methods, by expanding a first area corresponding to the gaze of the user from a first area to a second, larger area to find additional entities in the frame based on determining that an entity in the first area was the incorrect disambiguation of the ambiguous entity in the search query, will continuously find more objects that may disambiguate the ambiguous entity in a search query based on the gaze of the user. Thus, the systems and methods achieve the accuracy of using gaze to disambiguate a search query while simultaneously including flexibility such that additional entities can be found if the direct view of the user did not yield the correct result. The described systems and methods additionally describe building and adapting a user profile, which allows the described systems and methods to determine what the user likes or looks at the most often, and will help the systems and methods to more quickly determine the correct entity to disambiguate the ambiguous entity in the search query.

It should be noted the systems and/or methods described above may be applied to, or used in accordance with, other systems, methods and/or apparatuses described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
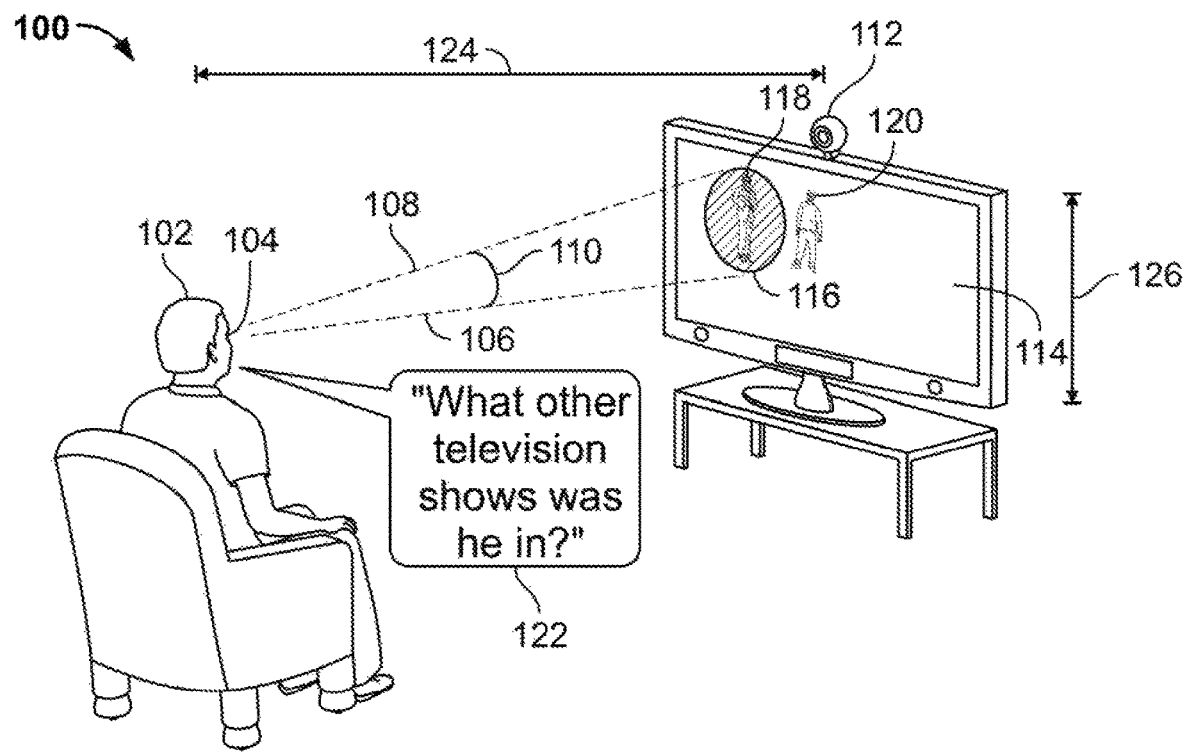
FIG. 1 shows an illustrative example of a media guidance application monitoring the gaze of a user and receiving a search query including an ambiguous entity, in accordance with some embodiments of the disclosure.

Systems and methods are described herein for disambiguation of an ambiguous entity in a search query based on the gaze of a user. These systems and methods may be implemented by a media guidance application (e.g., executed by user equipment associated with the user). In some aspects, the media guidance application may monitor the gaze of the user and attempt to disambiguate the ambiguous entity based on an area of the screen the user viewed while issuing the search query. If the media guidance application receives an indication that it did not disambiguate the ambiguous entity in the search query correctly, the media guidance application may increase the area of the screen that the user viewed in order to find an additional entity. This may allow the media guidance application to quickly and accurately find the correct answer to the user's search query.

For example, a user may be watching a media asset (e.g., episode 9 of season 1 of "Game of Thrones," entitled "Baelor") and may want to know how old is an actor (e.g., Jack Gleeson) who plays one of the characters (e.g., Joffrey Baratheon) in the media asset. The user may ask "How old is he?" when Joffrey Baratheon is present in a scene. Based on determining that the area of the screen corresponding to the gaze of the user contains Ned Stark, played by Sean Bean, the media guidance application may answer with "Did you a mean Sean Bean?" Upon the user responding "No," the media guidance application may increase the area of the screen: if the increased area includes Joffrey Baratheon, the media guidance application may answer with "Did you mean Jack Gleeson?" In this way, the media guidance application may quickly identify and disambiguate the ambiguous entity included in the user's search request, without having to guess every entity in the frame.

The media guidance application may monitor the gaze of the user during playback of "Baelor." The media guidance application may determine an area of the screen that the user is looking at continuously, at predetermined intervals, randomly, or during any other suitable time frame. The media guidance application may store, in a user profile associated with the first user, data indicating what area the user was looking at each time the media guidance application monitored the gaze of the user. For example, at 6:50 PM, the media guidance application may determine a first area of the screen that corresponds to the user's gaze at 6:50 PM. The media guidance application may determine that the frame being generated for display at 6:50 PM was the frame at the fiftieth minute of "Baelor." The media guidance application may compare the first area to the metadata associated with the frame at the fiftieth minute of "Baelor" to determine that the user was looking at Ned Stark, played by Sean Bean. The media guidance application may store, in the user profile, indications of the time (e.g., 6:50 PM), the frame (e.g., the frame at the fiftieth minute of "Baelor), and the entity (e.g., Sean Bean) that the user viewed at 6:50 PM. The media guidance application may also store a weighting profile in the user profile, which indicates how important an entity is (or how often the user looks at said entity).

At a second time after the first time (e.g., 6:52 PM), the media guidance application may determine a second area that corresponds to the gaze of the user at that time. The media guidance application may also detect that a user says "How old is he?" and may then determine that the use of the pronoun "he" in the question indicates that the question includes an ambiguous entity. In response, the media guidance application may seek to narrow the possible entities that correspond to the ambiguous entity in the question. To do so, the media guidance application may determine a frame that corresponds to the current time at which the question was asked, which may be the frame occurring at the fifty-second minute of "Baelor." Once the frame is identified, the media guidance application may retrieve metadata about that frame, such as the location of a first entity (e.g., Ned Stark played by Sean Bean), second entity (e.g., Joffrey Baratheon played by Jack Gleeson), and a third entity (e.g., Cersei Lannister played by Lena Headey) in the frame. Note that entities may be actors, actresses, objects, or characters, or any other suitable entity in a frame.

The media guidance application may then determine whether the second area overlaps with any of the locations of the first entity, the second entity, or the third entity. For example, the media guidance application may determine that the second area overlaps with only the first entity. If this is the case, the media guidance application may generate for display to the user a prompt that says "Did you mean Sean Bean?"

However, the second area may overlap with, for example, the first and third entities. The media guidance application may then determine which entity to prompt the user with. For example, the media guidance application may determine, from the weighting profile stored in the user profile, that Sean Bean has a greater weight than Lena Headey, which may indicate that the user has viewed Sean Bean more often than the user has viewed Lena Headey. As a result, the media guidance application may ask the user if he or she meant Sean Bean. Additionally or alternatively, the media guidance application may access a social media popularity of Sean Bean and Lena Headey, and based on the information therein, determine that, for example, Sean Bean is more popular, and thus ask the user if he or she meant Sean Bean. Additionally or alternatively, the media guidance application may use the gaze of other users who are also viewing "Baelor" to determine whether to prompt the user with the first entity or the third entity. For example, if another user was looking at Sean Bean at the current time the question was posed, the media guidance application may, as a result, ask the user if he or she meant Sean Bean. Additionally or alternatively, the media guidance application may use a knowledge graph to determine that the pronoun only applies to one of the first entity and the third entity. For example, because the pronoun "he" in the question indicates that the user is referring a male, the media guidance application may ask the user if he or she meant Sean Bean, because Sean Bean is male and Lena Headey is female.

The media guidance application may then receive the user's response to the inquiry. For example, the user may then respond "no" or "the other one" to the media guidance application's prompt "Did you mean Sean Bean?" In response, the media guidance application may attempt to determine another entity that may disambiguate the search query and adjust the user profile. For example, in order to determine another entity, if the third entity was in the second area, the media guidance application may prompt the user with the third entity. However, assuming that the third entity was not in the second area, the media guidance application may expand the second area, and determine that, for example, the second entity (e.g., Joffrey Baratheon played by Jack Gleeson) is in the expanded second area. Additionally, the media guidance application may access previously stored data about the users gaze and further analyze that data to edit the user profile. For example, the media guidance application may access the information stored at 6:50 PM, that is, that the user was looking at Sean Bean in the frame at the fiftieth minute of "Baelor." The media guidance application may expand the first area (i.e., the area that corresponded to the user's gaze at 6:50 PM) to determine that the expanded first area overlaps with the third entity. Because the system has not yet determined whether the user was looking at the second entity (e.g., Joffrey Baratheon played by Jack Gleeson) or the third entity (e.g., Cersei Lannister played by Lena Headey), the media guidance application may decrease the weight of Sean Bean in the weighting profile, as the user was definitely not looking at Sean Bean, and increase the weight of Lena Headey and Jack Gleeson equally.

If the media guidance application determines that Jack Gleeson is in the expanded second area of the fifty-second frame of "Baelor," the media guidance application may issue the audio prompt "Did you mean Jack Gleeson?" If the user answers "yes" to the media guidance application's prompt, the media guidance application may then determine the answer to the user's question, provide additional information about the second entity, and edit the user profile. For example, the media guidance application may answer the question "How old is he?" by saying or generating for display "24." Furthermore, the media guidance application may display a listing for the show "Killinskully" or the movie "Batman Begins," both of which contain Jack Gleeson, biographical information about Jack Gleeson, or any other appropriate information about Jack Gleeson. Finally, the media guidance application may adjust the weighting profile in the user profile of the user by decreasing the weight of Sean Bean (because the media guidance application now knows that the user was not looking at Sean Bean) and increase the weight of Jack Gleeson.

FIG. 1 shows an illustrative example 100 of a media guidance application monitoring the gaze of a user and receiving a search query including an ambiguous entity, in accordance with some embodiments of the disclosure. For example, user 102 may be viewing playback of a media asset on display 114, which may have height 126. Eye 104 of user 102 may be monitored by detector 112. Currently, where eye 104 is looking may correspond to gaze 108. Gaze 108 may be at a vertical degree 110 from reference gaze 106. Eye 104 of user 102 may be located at distance 124 away from display 114. Gaze 108 may correspond to area 116, which may overlap with the location of entity 118 in the media asset being displayed on display 114. Area 116 may not overlap with the location of entity 120 in the media asset being displayed on display 114. In some embodiments, entity 118 and entity 120 may be at least one of an actor, an actress, an object, an animal, and a character. While user 102 is watching the media asset on display 114, the user may utter search query 122 (i.e., "What other television show was he in?").

In some embodiments, the media guidance application may monitor, using control circuitry, gaze 108 of user 102 during playback of the media asset on display 114. The media guidance application may monitor gaze 108 of user 102 by monitoring vertical degree 110 of eye 104 of user 102, a horizontal degree of eye 104 of user 102 (e.g., horizontal angle 210 of FIG. 2 below), and a position of eye 104 of user 102 relative to display 114. Detector 112 may be a camera, an infrared detector, contact lens detector, wearable camera, wearable technology, optical sensor, or any other suitable detector for determining the motion/angle of eye 104 and the position of eye 104 relative to display 114. In order to not overcomplicate the drawing, a single detector is shown, however, multiple detectors may used. For example, if detector 112 is a camera, the media guidance application may use a reference point in the room to determine the position of eye 104 relative to the reference point. Using this position, the media guidance application may determine, based on the position of the eye relative to the reference point, and a position of the reference point from display 114, determine the position of eye 104 relative to display 114. Additionally or alternatively, the media guidance application may use an average size of the head of a human to model the size of the head of user 102, and based on this information, determine the position of eye 104, including distance 124, from display 114. Additionally or alternatively, the media guidance application may use two detectors to capture images of the room to determine the position of eye 104 relative to display 114. The media guidance application may determine the position of eye 104 of user 102 by determining distance 124, as well as a vertical displacement from the center of display 114 and a horizontal displacement from the center of display 114. For example, the media guidance application may use detector 112 to determine that eye 104 of user 102 is located at distance 124, which may be six feet, from display 114 playing the media asset "Baelor," and that eye 104 of user 102 is aligned with the center of display 114 at 6:52 PM.

In some embodiments, the media guidance application may also determine vertical angle 110 from reference gaze 106 using detector 112. Reference gaze 106 may be the gaze at which eye 104 of user 102 is directed at the center of display 114, may be the gaze of eye 104 of user 102 if they were to look straight ahead and level with the vertical displacement of eye 104, or any other suitable reference determined by the media guidance application. For example, the media guidance application may determine reference gaze 106 to be the gaze at which eye 104 of user 102 is directed at the center of screen by prompting user 102 to look at an object at the center of display 114 and determining reference gaze 106 using an image taken by detector 112 of eye 104 of user 102 at that time.

The media guidance application may determine vertical angle 106 of gaze 108 with respect to reference gaze 106 using detector 112. For example, the media guidance application may control the detector 112 to emit an infrared light towards eye 104 of user 102. The media guidance application may receive, from detector 112, an image of eye 104 of user 102. Using contrast imaging, in some embodiments, the media guidance application may determine the location of the pupil of eye 104 of user 102 and the location of a reflection of the infrared light emitted by detector 112. The media guidance application may additionally or alternatively use other light sources in a similar manner. The media guidance application may determine a vector between the pupil of eye 104 and the location of the reflection to determine vertical angle 110 and a horizontal angle (i.e., horizontal angle 210 of FIG. 2) of gaze 108 of eye 104 of user 102 with respect to reference gaze 106. For example, the media guidance application may use detector 112 to determine that gaze 108 of eye 104 of user 102 is at a horizontal angle of 8 degrees to the left reference gaze 106 and that gaze 108 of eye 104 of user 102 is at vertical angle 110 from reference gaze 106. For example, vertical angle might be 5 degrees above reference gaze 106. More details on determining vertical angle 110 of gaze 108 from reference gaze 106 are presented below in relation to FIG. 11.

In some embodiments, the media guidance application may determine a size of display screen 114 displaying the media asset. For example, the media guidance application may determine that display 114 is a 42 inch television, and has height 126, which may be 20.6 inches, and a width (e.g., width 228 of FIG. 2) of 36.6 inches. For example, the media guidance application may receive a data packet from display 114 that indicates the dimensions of display 114, the diagonal size of display 114, the resolution of display 114, or any other suitable attribute of display 114.

In some embodiments, the media guidance application may determine area 116 of display 114 corresponding to gaze 108 of user 102. In some embodiments, the media guidance application may assume that area 116 is defined as a circle centered on the point corresponding to gaze 108 of user 102. For example, the media guidance application may determine that the point corresponding to gaze 108 of user 102 is about 10 inches left of the center of display 114 and 6 inches above the center of display 114 based on vertical angle 110 (e.g., approximately 5 degrees above the center of display 114), a horizontal angle of gaze 108 (e.g., horizontal angle 210 of FIG. 2, or approximately 8 degrees left of the center of display 114), the position of eye 104 of user 102 (i.e., aligned with the center display 114), and distance 124 (e.g., six feet) of eye 104 from the display 114. The media guidance application may determine the point corresponding to gaze 108 of user 102 using the following functions: $x_{gaze\ 108} = x_{eye} + (\text{distance } 124)*\tan(\text{horizontal angle})$ and $y_{gaze\ 108} = y_{eye} + (\text{distance } 124)*\tan(\text{vertical angle } 110)$. Area 116 may be any suitable radius, for example, three inches. In other embodiments, the media guidance application may determine a plurality of horizontal and vertical angles at which the user's eyes paused or changed directions (i.e., fixation points), and use those points to define the edges or vertices of the outer bound of area 116 (e.g., fixation points 450, 452, and 454 of FIG. 4). In some embodiments, the media guidance application may store, in a memory, a data structure indicating the area 116 and the current time (i.e., 6:52 PM).

While the preceding embodiments discuss determining area 116 on two dimensional display 114, in some embodiments, the media guidance application may display the media asset as a 360 degree monoscopic video (e.g., on a virtual reality headset). In such embodiments, the media guidance application may use detector 112, which may be a virtual reality headset, camera, virtual reality glasses, infrared sensor, or any other suitable detector, to determine vertical angle 110 of eye 104 of user 102 and a horizontal angle of eye 104 of user 102 in a similar manner to as described above. Detector 112 may additionally determine a position the head of user 102. In the case of a virtual reality headset, the media guidance application may use detector 112 to determine the position (which may include the angle of the head of user 102 and the direction user 102 is facing) of the head of user 102 using a gyroscope, accelerometer, or any other suitable measuring tool. The media guidance application may use vertical angle 110, the horizontal angle, the position of the head of user 102 to determine gaze 108 of user 102. The media guidance application may further determine distance 124 (which may be a virtual distance) from the displayed media asset. For example, the media guidance application may receive an indication of distance 124 from a media content source. The media guidance application may use the determined gaze 108 of user 102 and distance 124 to determine an area 116 of the displayed media asset that corresponds to gaze 108. For example, the media guidance application may project gaze 108 on a two dimensional plane representing the 360 monoscopic video using the distance 124. The media guidance application may then determine area 116 in a manner similar to as described above in relation to determining area 116 on display 114.

In some embodiments, the media asset may displayed as a three dimensional, 360 degree stereoscopic video. The media guidance application may determine vertical angle 110 of eye 104 of user 102, the horizontal angle of eye 104 of user 102, the position of the head of user 102 in a similar manner to as described above in relation to determining the same values for a 360 degree monoscopic video. The media guidance application may additionally determine the vertical angle of a second eye of user 102 and the horizontal angle of the second eye of user 102. The media guidance application may determine gaze 108 of eye 104 and a gaze of the second eye of user 102. The media guidance application may determine the focal depth of eye 104 and the second eye ("the eyes") of user 102. For example, the media guidance application may determine a vergence of gaze 108 and the gaze of the second eye based on the determined gaze 108 and the gaze of the second eye and the distance between eye 104 and the second eye. The media guidance application may then determine a volume corresponding to the focal depth of the eyes of user 102. For example, the media guidance application may determine that the point corresponding to the vergence of gaze 108 and the gaze of the second eye, and may determine that the volume is a sphere surrounding the point corresponding to the vergence.

In some embodiments, the media guidance application may receive search query 122 from user 102 at the current time. For example, the media guidance application may determine that user 102 spoke search query 122 using detector 112 at 6:52 PM. In some embodiments, the media guidance application may determine that search query 122 includes an ambiguous entity. For example, the media guidance application may determine that the word "he" in search query 122 is a pronoun that refers to a human or animal entity by referencing a database of pronouns. The media guidance application may thus determine that the pronoun "he" in search query 122 refers to an ambiguous entity. More details regarding determining that search query 122 includes an ambiguous entity are discussed below in relation to FIG. 12.

In some embodiments, the media guidance application may create a user profile for user 102 by monitoring gaze 108 of user 102 at a prior time before the current time. For example, the media guidance application may monitor gaze 108 of user 102 at 6:50 PM while user 102 is watching the media asset on display 114 in a manner similar to as described above in relation to monitoring gaze 108 of user 102 at the current time (6:52 PM). In some embodiments, the media guidance application may store, in the user profile, a data structure indicating an area of the screen corresponding to gaze 108 of user 102 at the prior time. The media guidance application may determine the area corresponding to gaze 108 of user 102 at the prior time in a similar manner as described above for determining area 116. For example, the data structure may indicate the area of the screen corresponding to gaze 108 of user 102 at the prior time and 6:50 PM. In some embodiments, the media guidance application may determine a frame of the media asset corresponding to the prior time. For example, in order to determine the frame of the media asset corresponding to the prior time, the media guidance application may then retrieve a viewing log. The viewing log may indicate interactions with the media guidance application, specifically, the viewing log may indicate what media assets were selected, at what time, and whether any of the media assets were paused, played, fast forwarded, rewound, etc. and at what time, and for what duration, such actions were input. For example, the media guidance application may determine that the viewing log indicates that user 102 started watching "Baelor" at 6:00 PM and has not stopped or paused "Baelor" since. The media guidance application may therefore determine that 6:50 PM corresponds to the frame occurring at the fiftieth minute of "Baelor" based on the viewing log. For example, the media guidance application may determine that the frame corresponding to the prior time is the frame occurring at the fiftieth minute of "Baelor."

In some embodiments, the media guidance application may retrieve, from a database, metadata relating to the frame of the media asset corresponding to the prior time, the metadata relating to the frame corresponding to the prior time indicating a location of entity 118 and a location of a third entity in the frame corresponding to the prior time. For example, the media guidance application may retrieve the metadata relating to the frame at the fiftieth minute of "Baelor" by transmitting a signal, to the database, requesting the metadata relating to the frame occurring at the fiftieth minute of "Baelor" and receive data packets containing the metadata in return. The metadata may include the location of entity 118 (i.e., Sean Bean) in the frame occurring at the fiftieth minute of "Baelor" and the location of Lena Headey (i.e., the third entity) in the same frame. The metadata may indicate the location of entity 118 in the frame corresponding to the prior time in any suitable manner. For example, the metadata may use a bounding box to define the location of entity 118, where the top left corner of the bounding box and the bottom right corner of the bounding box are defined in x-y coordinates, x being the horizontal displacement, in pixels, from the center of the frame and y being the vertical displacement, in pixels, from the center of the frame. Any suitable coordinate system could be used (e.g., displacement from the top left corner of the screen). Furthermore, any suitable definition for the location of the entity 118 in the frame corresponding to the prior time may be used. For example, the media guidance application may determine that the metadata defines the complete, complex boundary of entity 118, may define every pixel that makes up entity 118, may define an oval or circle encircling entity 118, or may define a loose boundary that connects edges of entity 118. In some embodiments, the media guidance application may translate these coordinates to determine the location of entity 118 in the frame corresponding to the prior time to determine the location of entity 118 in coordinates that are on the same scale as display 114. In some embodiments, the metadata relating to the frame at the fiftieth minute of "Baelor" may indicate the location of Sean Bean and may indicate the location of Lena Headey in the frame at the fiftieth minute of "Baelor" in any of the above described manner.

In some embodiments, the media guidance application may determine that the area corresponding to gaze 108 of user 102 at the prior time overlaps with the location of entity 118 in the frame corresponding to the prior time. For example, the media guidance application may determine that the area corresponding to gaze 108 of user 102 at the prior time overlaps with the location of entity 118 in the frame corresponding to the prior time be determining that the area corresponding to gaze 108 of user 102 at the prior time includes a pixel or a point that the location of entity 118 also includes. In some embodiments, the media guidance application generates the media asset for displays as a three dimensional, 360 degree stereoscopic video, the media guidance application may determine that the volume corresponding to focal depth of user 102 overlaps with a location of entity 118 in the frame corresponding to the prior time. In these embodiments, the location of entity 118 in the frame corresponding to the prior time may be defined in any suitable manner, such as a three dimensional bounding box. The media guidance application may determine the the volume corresponding to the focal depth of user 102 overlaps with the three dimension bounding box of entity 118 by determining that the volume contains the same point in space at the three dimensional bounding box.

In some embodiments, the media guidance application, based on determining that the area corresponding to gaze 108 of user 102 at the prior time overlaps with the location of entity 118 in the frame corresponding to the prior time, may store, in the user profile, a data structure indicating the first entity, the frame corresponding to the prior time, and the third area. For example, the media guidance application may store a data structure indicating Sean Bean, the frame at the fiftieth minute of "Baelor," and the area corresponding to gaze 108 of user 102 at the prior time in the user profile. In some embodiments, the media guidance application may further store, in the user profile, a weighting profile. The weighting profile may assign a first weight to entity 118, a second weight to the entity 120, and a third weight to the third entity. For example, the media guidance application may store a weighting profile indicating that Sean Bean (i.e., entity 118) is assigned a weight of 40%, Jack Gleeson (i.e. entity 120) is assigned a weight of 30%, and Lena Headey is assigned a weight of 30%, based on the area corresponding to gaze 108 of user 102 at the prior time overlapping with the location of Sean Bean in the frame at the fiftieth minute of "Baelor." The weighting profile may indicate, for example, how often user 102 has viewed each of the entities, how much time user 102 has spent looking at each of the entities, or how important each of the entities is to user 102.

In some embodiments, the media guidance application may additionally store, in the user profile, a data structure indicating a plurality of entities that correspond to gaze 108 of user 102 at a plurality of times prior to the current time. In some embodiments, the media guidance application may continuously monitor gaze 108 of user 102 at the plurality of times. The media guidance application may compare gaze 108 of user 102 with metadata relating to each frame corresponding to the plurality of times at which the media guidance application monitored gaze 108 of user 102 in a manner similar to as described above in relation to determining that the area 116 with the location of entity 118 in the frame. In some embodiments, the media guidance application may add each entity that corresponds to the gaze of the user at the plurality of times to the data structure. The media guidance application may store, in the user profile, the data structure containing each entity. For example, at a time prior to the current time, the media guidance application may determine that the user looked at entity 118 (e.g., Sean Bean), and add an indication of entity 118 to the data structure.

Figure 2:
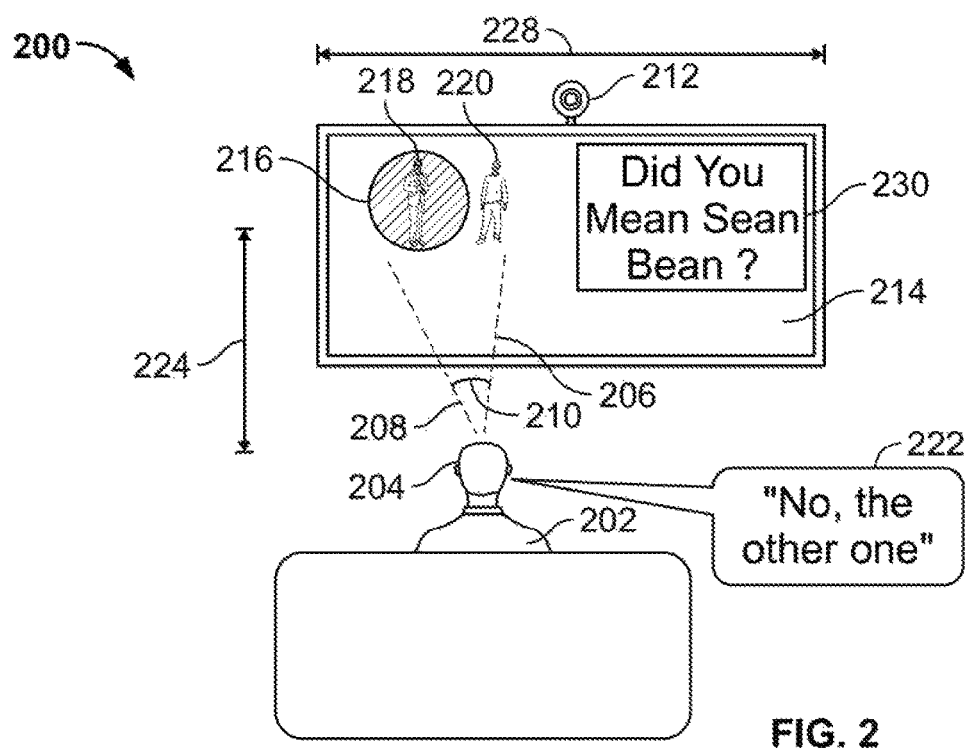
FIG. 2 shows an illustrative example of a media guidance application incorrectly disambiguating a search query including an ambiguous entity based on monitoring the gaze of a user, in accordance with some embodiments of the disclosure.

FIG. 2 shows an illustrative example 200 of a media guidance application incorrectly disambiguating a search query including an ambiguous entity based on monitoring the gaze of a user, in accordance with some embodiments of the disclosure. For example, user 202 may be viewing playback of a media asset on display 214, which may have width 228, which may be determined in a similar manner as described above in relation to determining height 126 in relation to FIG. 1. Eye 204 of user 202 may be monitored by detector 212. Gaze 208 may be monitored by detector 212, specifically, horizontal angle 210 from reference gaze 206 may be monitored by detector 212. Based on distance 224 from display 214, horizontal angle 210, a vertical angle from reference gaze 206, and the position of eye 204 of user 202, the media guidance application may determine area 216 corresponding to gaze 208 of user 202. Area 216 may overlap with the location of entity 218, but may not overlap with the location of entity 220. In response to search query 122 of FIG. 1, the media guidance application may generate for display, on display 214, prompt 230. User 202 may respond to prompt 230 with negative input 222. Detector 212 may monitor gaze 208 and horizontal angle 210 in a similar manner to as described about with regards to monitoring gaze 108 with detector 112 in FIG. 1. Additionally, area 216 may correspond to area 116 of FIG. 1.

In some embodiments, the media guidance application may, based on determining that search query 122 of FIG. 1 includes the ambiguous entity, retrieve, from the memory, a data structure indicating area 216 (which may correspond to area 116 of FIG. 1 above) and the current time. In some embodiments, the media guidance application may determine a frame of the media asset displayed on display 214 that corresponds to the current time. For example, the media guidance may extract, by executing an SQL script utilizing the declarative "Select" command, the current time from the data structure. The media guidance application may determine that 6:52 PM corresponds to the frame occurring at the fifty-second minute of "Baelor" in a similar manner as described above with regards to determining the frame of the media asset corresponding to the prior time in relation to FIG. 1.

In some embodiments, the media guidance application may retrieve, from a database, metadata relating to the frame of the media asset that corresponds to the current time. The metadata may include a location of entity 218 in the frame and a location of entity 220 in the frame. For example, the media guidance application may transmit a signal, to the database, requesting the metadata relating to the frame occurring at the fifty-second minute of "Baelor" and receive data packets with the metadata in return. The metadata may include the location of entity 218 (i.e., Sean Bean) in the frame occurring at the fifty-second minute of "Baelor" and the location of entity 220 (i.e., Jack Gleeson) in the same frame. The metadata may indicate the location of entity 218 and the location of entity 220 in the frame in any manner as described above in relation to indicating the location of entity 118 and the location of the third entity in the frame occurring at the fiftieth minute of "Baelor."

In some embodiments, the media guidance application may extract, by executing an SQL script utilizing the declarative "Select" command, from the data structure, the area 216 corresponding to the current time. For example, the media guidance application may determine that area 216 is defined by a circle with a radius of three inches centered at 10 inches left of center and 6 inches above center of display 214. In some embodiments, the media guidance application may extract, by executing an SQL script utilizing the declarative "Select" command, from the metadata, the location of entity 218 in the frame. For example, the media guidance application may determine that the location of entity 218 in the frame may be defined by a bounding box, the upper left corner of the bounding box at 10 inches left of center and 9 inches above center, and the lower right corner of the bounding box at 7 inches left of center and 5 inches above center.

In some embodiments, the media guidance application may determine the location of entity 218 using facial recognition software or object recognition software. For example, the media guidance application may analyze, using facial recognition software, the frame at the current time to determine the identity of entity 218 and the location of a head of entity 218. The media guidance application may then use image analysis software to determine a body of entity 218. The media guidance application may determine that the location of entity 218 is defined by the location of the body of entity 218 and the location of the head of entity 218. As another illustrative example, the media guidance application may use object recognition software to determine the location of entity 218. For example, if entity 218 is a specific sword, the media guidance application may analyze the scene using object recognition software to determine the location of a sword in the frame, and then compare the sword to an image of the specific sword to determine that entity 218 is the specific sword. The media guidance application may determine that the location of entity 218 is the location of the sword in the frame based on the comparison.

In some embodiments, the media guidance application may determine that area 218 overlaps with the location of entity 218 in the frame in a manner similar to as discussed above in relation to determining that the area corresponding to gaze 108 of user 102 at the prior time overlaps with the location of entity 118 in the frame corresponding to the prior time. In some embodiments, based on determining that area 216 overlaps with the location of entity 218 in the frame, the media guidance application may generate for display prompt 230, which may prompt the user to input additional information. Prompt 230 indicates that entity 218 may be a first potential disambiguation of the ambiguous entity in search query 122 of FIG. 1. For example, the media guidance application may generate for display prompt 230 by generating for display a text box containing "Did you mean Sean Bean?" In some embodiments, the media guidance application may generate for display, with prompt 230, an image of entity 218, video content related to entity 218, or any other suitable visual element that allows user 202 to identify entity 218. In some embodiments, instead of generating for display prompt 230, the media guidance application may issue prompt 230 verbally by issuing "Did you mean Sean Bean?" verbally.

In some embodiments, the media guidance application may receive negative input 222 from user 202 subsequent to generating for display prompt 230. The media guidance application may determine that negative input 222 indicates that entity 218 is an incorrect disambiguation of the ambiguous entity in search query 122 of FIG. 1. For example, after the media guidance application generates for display prompt 230, user 202 may say negative input 222 (i.e. "No, the other one.") to indicate that user 202 was not asking about what other television shows Sean Bean was in.

Figure 3:
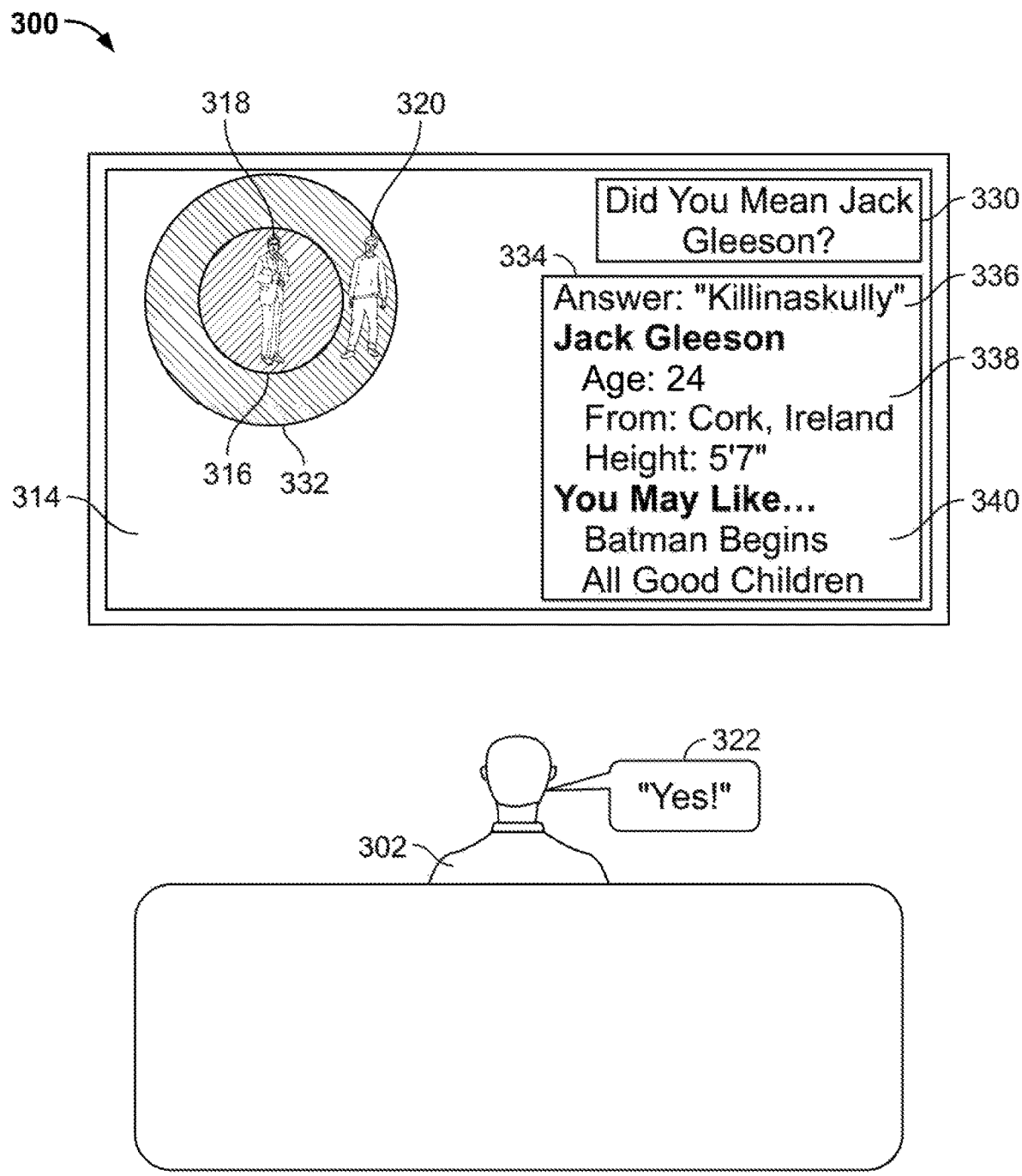
FIG. 3 shows an illustrative example of a media guidance application correctly disambiguating a search query based on increasing the area of the users gaze, in accordance with some embodiments of the disclosure.

FIG. 3 shows an illustrative example 300 of a media guidance application correctly disambiguating a search query based on increasing the area of the users gaze, in accordance with some embodiments of the disclosure. For example, user 302 may be viewing playback of a media asset on display 314. Area 316 may correspond to the gaze of user 302. Area 316 may overlap with the location of entity 318, but not overlap with the location of entity 320. The media guidance application may expand area 316 to area 332, which may overlap with the location of entity 318 and the location of entity 320. The media guidance application may receive affirmative input 322 from the user subsequent to generating for display prompt 330, which may attempt to disambiguate a search query (e.g, search query 122 of FIG. 1) with an ambiguous entity by suggesting entity 320 as a potential disambiguation of the ambiguous entity. Simultaneous with generating for display prompt 330, or in response to receiving affirmative input 322, the media guidance application may generate for display menu 334. Menu 334 may include answer 336 to the search query, additional information 338 about entity 320, and media listings 340 which may include listings for media content that contains entity 320.

In some embodiments, based on receiving a negative input (e.g. negative input 222 of FIG. 2), the media guidance application may attempt to find additional entities that may disambiguate the ambiguous entity in the search query (e.g., search query 122 in FIG. 1). In some embodiments, in order to find additional entities that may disambiguate the ambiguous entity in the search query, the media guidance application may expand area 316 to area 332 of display 314, area 332 being larger than area 316. For example, the media guidance application may expand area 316, which may be defined by a circle centered at 10 inches left of the center of display 314 and 6 inches above the center of display 314 with a radius of 3 inches, to area 332, which may be a circle centered at 10 inches left of the center of display 314 and 6 inches above center of display 314 with a radius of 6 inches. In an embodiment in which focus points are used, each vertex or edge may move away from the center of area 316 by a uniform distance (e.g., 3 inches).

In some embodiments, the media guidance application may extract, from metadata relating to the frame of the media asset that corresponds to the current time, the location of entity 318 in the frame corresponding to the current time. For example, the media guidance application may extract, by executing an SQL script utilizing the declarative "Select" command, the location of entity 320 (e.g., Jack Gleeson) in the frame, and determine that location of entity 320 in the frame may be defined by a bounding box, the upper left corner of the bounding box at 5 inches left of center and 7 inches above center, and the lower right corner of the bounding box at 2 inches left of center and 3 inches above center. In some embodiments, the media guidance application may determine that area 332 overlaps with location of entity 320. The media guidance application may determine that area 332 overlaps with location of entity 320 in a similar manner as described above in relation to determining that area 216 overlaps with the location of entity 218 with regards to FIG. 2 above.

In some embodiments, based on determining that area 332 overlaps with the location of entity 320 in the frame, the media guidance application may generate for display prompt 330. Prompt 330 indicates entity 320 as a second potential disambiguation of the ambiguous entity in the search query. For example, the media guidance application may generate for display prompt 330 by generating for display prompt 330 containing "Did you mean Jack Gleeson?" In some embodiments, instead of generating for display prompt 330, the media guidance application may issue prompt 330 verbally by issuing "Did you mean Jack Gleeson?" verbally.

In some embodiments, the media guidance application may update the user profile based on receiving the negative input (e.g., negative input 222 of FIG. 2). For example, the media guidance application, based on receiving the negative input user 302, the media guidance application may retrieve a data structure indicating entity 318 (e.g., Sean Bean, which may correspond to entity 118 of FIG. 1), a frame of the media asset corresponding to a prior time (e.g., the frame at the fiftieth minute of "Baelor" corresponding to 6:50 PM), and an area corresponding to a gaze of user 302 at the prior time (e.g., the area corresponding to gaze 108 of user 102 at 6:50 PM, as described in relation to FIG. 1) from the user profile. In some embodiments, the media guidance application may retrieve, based on the data structure, the metadata relating to the frame corresponding to the prior time. For example, the media guidance application may retrieve the metadata relating to the frame at the fiftieth minute of "Baelor" that indicates the location entity 318 and the location of a third entity (e.g., Lena Headey) in the frame at the fiftieth minute of "Baelor."

In some embodiments, the media guidance application may extract, from the data structure, the area corresponding to the gaze of user 302 at the prior time. For example, the media guidance application, may extract, by executing an SQL script utilizing the declarative "Select" command, the area corresponding to the gaze of user 302 at the prior time from the data structure indicating entity 318, the frame corresponding to the prior time, and the area corresponding to the gaze of user 302 at the prior time. In some embodiments, the media guidance application may expand the area corresponding to the gaze of user 302 at the prior time to a new, larger area of the display screen. For example, the media guidance may expand the area corresponding to the gaze of user 302 at the prior time to the new area in a similar manner as described above in relation to expanding area 316 to area 332. In some embodiments, the media guidance application may extract a location of the third entity from metadata relating to the frame corresponding to the prior time. For example, the media guidance application may extract the location of Lena Headey from the metadata relating to the frame at the fiftieth minute of "Baelor."

In some embodiments, the media guidance application may determine that the new area overlaps with the location of the third entity in the frame corresponding to the prior time. For example, the media guidance application may determine that the new area overlaps with the location of Lena Headey in the frame at the fiftieth minute of "Baelor." The media guidance application may do so in a manner similar to as described above in relation to determining that area 332 overlaps with the location of entity 320.

In some embodiments, the media guidance application may, based on determining that the new area overlaps with the location of the third entity in the frame corresponding to the prior time and that area 332 overlaps with the location of entity 320, decrease a first weight in a weighting profile (e.g., the weighting profile as described above in relation to FIG. 1) by a first amount, increase the second weight by a second amount, and increase the third weight by the second amount. For example, the media guidance application may decrease the weight for entity 316 (e.g., Sean Bean) from 40% to 30% as the media guidance application determined, based on the negative response, that user 302 was not looking at entity 316, and increase the weights for entity 320 (e.g., Jack Gleeson) and Lena Headey from 30% to 35%.

In some embodiments, the media guidance application may receive, subsequent to generating for display prompt 330, affirmative input 322 from user 302. Affirmative input 322 may indicate that entity 320 is a correct disambiguation of the ambiguous entity in the search query (e.g., search query 122 of FIG. 1). For example, the media guidance application may, after the media guidance application generates for display prompt 330 (i.e., the text box containing "Did you mean Jack Gleeson?"), detect user saying affirmative input 322 (i.e., "Yes!"). In some embodiments, the media guidance application may generate for display a selectable icon for the user to input affirmative input 322. In some embodiments, the media guidance application may update the user profile and gather additional information about the disambiguated entity based on affirmative input 322.

In some embodiments, to update a user profile and a weighting profile stored therein, the media guidance application may, based on receiving affirmative input 322, decrease a weight for entity 316 by an amount and increase a weight for entity 318 by the amount. For example, the media guidance application may decrease the weight assigned to entity 318 (e.g., Sean Bean) from 40% to 30%, as the media guidance application now knows that user 302 was not looking at entity 316, and increase the weight assigned to entity 320 (e.g., Jack Gleeson) from 30% to 40%. The media guidance application may not adjust a weight assigned to a third entity (e.g., Lena Headey) that is not in the frame corresponding to the current time because the media guidance application has received no additional information about the third entity from the conversation with user 302.

In some embodiments, the media guidance application may gather and generate for display menu 334 based on receiving affirmative input 322. The media guidance application may contact a database in order to determine answer 336 to the search query (e.g., "What other television shows was he in?"). For example, the media guidance application may use natural language processing to determine that the user is asking for television shows related to entity 320 that are not the current media asset. The media guidance application may transmit, to a database, data packets requesting a list of television shows that entity 320 was in. In response, the media guidance application may receive data packets with an indication of the TV show in answer 336 (i.e., "Killinaskully"). In some embodiments, the media guidance application may gather additional information 338 and media listings 340 by querying a database for additional information relating to entity 320 based on receiving affirmative input 322. For example, the media guidance application may search a database for metadata tags on media content indicating that entity 320 (i.e., Jack Gleeson) was an actor in the media content, and for metadata related to entity 320. In some embodiments, the media guidance application may generate for display media listings 340 in response to receiving media listings 340 from the database, and additional information 338 based on receiving the metadata related to entity 320. In some embodiments, the media guidance application may allow the user to select the media listings 340 and access the media content associated therewith.

Figure 4:
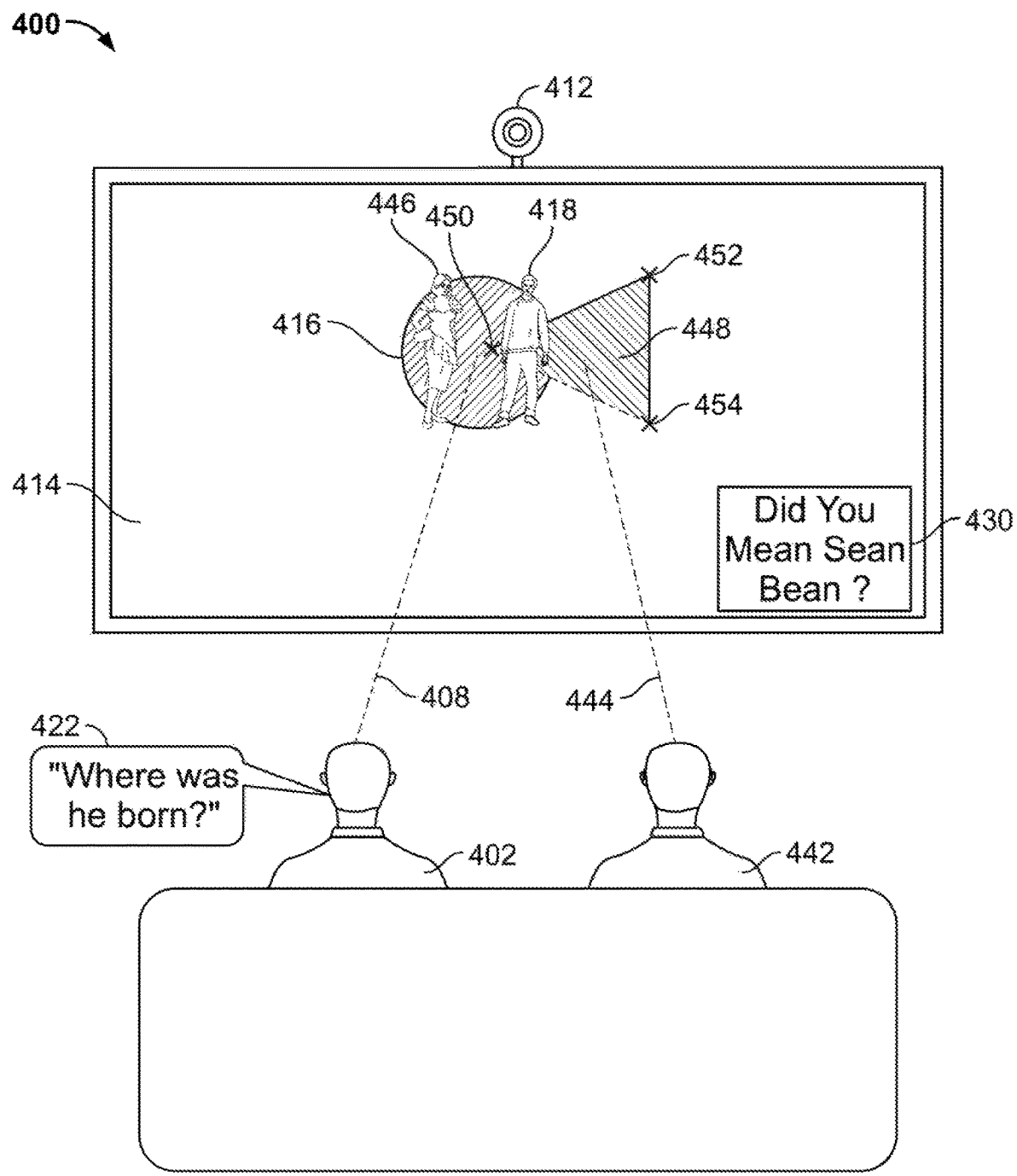
FIG. 4 shows an illustrative example of a media guidance application receiving and disambiguating a search query with an ambiguous entity from a first user based on the monitored gaze of the first and second user, in accordance with some embodiments of the disclosure.

FIG. 4 shows an illustrative example 400 of a media guidance application receiving and disambiguating a search query with an ambiguous entity from a first user based on the monitored gaze of the first and second user, in accordance with some embodiments of the disclosure. For example, user 402 and user 442 may be viewing playback of a media asset on display 414. Detector 412 may monitor gaze 408 of user 402 and may monitor gaze 444 of user 442, and may monitor the gaze of both users in a manner similar to as described above in relation to monitoring gaze 108 of user 102 in FIG. 1. Area 416 may correspond to gaze 408 of user 402, and area 448 may correspond to gaze 444 of user 442. The vertices of area 448 may be defined by focus point 450, focus point 452, and focus point 454. Area 416 may overlap with the location of entity 446 and with the location of entity 418, whereas area 448 may overlap with the location of entity 418, and may not overlap with the location of entity 446. While user 402 and user 442 are viewing playback of the media asset on display 414, user 402 may say search query 422 (i.e., "Where was he born?"), and in response, the media guidance application may attempt to disambiguate search query 422 by generating for display prompt 430.

In some embodiments, the media guidance application may determine area 448. In some embodiments, the media guidance application may do so by determining focus point 450, focus point 452, and focus point 454. For example, the media guidance application may always determine a predetermined number of focus points to define the vertices or edges of area 448. Alternatively or additionally, the media guidance application may determine the focus points over a predetermined amount of time to define the vertices or edges of area 448. If the number of focus points in the predetermined amount of time is less than 3, one of the focus points may be chosen as the center of area 448, and area 448 may be defined by a circle, similar to as described above in relation to area 116 of FIG. 1. The media guidance application may determine focus point 450, focus point 452, and focus point 454 in a manner similar to determining the point corresponding to gaze 108 of user 102 in relation to FIG. 1.

The media guidance application may receive search query 422 at a current time. In some embodiments, the media guidance application may determine that search query 422 includes an ambiguous entity in a similar manner as described above in relation to search query 122 of FIG. 1. Based on determining that search query 422 includes the ambiguous entity, the media guidance application may attempt to disambiguate the ambiguous entity. To do so, the media guidance application may determine that the area 416 overlaps with the location of entity 418 and the location of entity 446 in a similar manner as described above in relation to determining that area 116 overlaps with the location of entity 418 in regards to FIG. 1. For example, the media guidance application may determine the location of entity 418 and entity 446 in the frame of the media asset corresponding to the current time based by extracting, by executing an SQL script utilizing the declarative "Select" command, from metadata relating to the frame corresponding to the current time, the location of entity 418 and the location of entity 446. Based on determining that area 416 overlaps with the location of entity 418 and the location of entity 446, in some embodiments, the media guidance application may proceed to gather additional data concerning entity 418 and entity 446 in order to choose one of entity 418 and entity 446 to indicate in prompt 430 as a potential disambiguation of the ambiguous entity in search query 422.

In some embodiments, the media guidance application may gather additional data by receiving, using the control circuitry, a weighting profile from a user profile for user 402 (e.g., the weighting profile from the user profile as described above in relation to FIG. 1). In some embodiments, the media guidance application may receive the weighting profile from the user profile of user 402 based on determining that area 416 overlaps with the location of entity 418 and the location of entity 446 in the frame corresponding to the current time. The media guidance application may extract, from the weighting profile, a weight assigned to entity 418 and a weight assigned to entity 446. For example, the media guidance application may extract, by executing an SQL script utilizing the declarative "Select" command, the weight of 40% assigned to entity 418 (e.g., Sean Bean) and the weight of 30% assigned to entity 446 (e.g., Lena Headey) based on determining that area 416 overlaps with the location of entity 418 and the location of entity 446 in the frame corresponding to the current time. In some embodiments, the media guidance application may determine that the weight assigned to entity 418 is greater than the weight assigned to entity 446. In some embodiments, the media guidance application may generate for display prompt 430 based on determining that the weight assigned to entity 418 is greater than the weight assigned to entity 446. The media guidance application may determine that the user looked at entity 418 more often than entity 446 by determining that the weight of 40% assigned to entity 418 is greater than the weight of 30% assigned to entity 446, and thus, the media guidance application choose entity 418 for inclusion in prompt 430.

In some embodiments, the media guidance application may gather additional data by retrieving, from the user profile, a data structure indicating a plurality of entities that correspond to gaze 408 of user 402 at a plurality of times prior to the current time. The data structure may be similar to as described above in relation to FIG. 1. The media guidance application may compare entity 418 and entity 446 to the data structure indicating the plurality of entities to determine that the entity 418 is in the data structure indicating the plurality of entities and that the entity 446 is not in the data structure indicating the plurality of entities. For example, the media guidance application may extract, by executing an SQL script utilizing the declarative "Select" command, the plurality of entities based on determining that area 416 overlaps with the location of entity 418 and entity 446. The media guidance application may determine that entity 418 is in the plurality of entities, and that entity 446 is not. In some embodiments, the media guidance application may generate for display prompt 430 based on determining that entity 418 is in the plurality of entities, and that entity 446 is not.

In some embodiments, the media guidance application may gather additional data by retrieving, from the database, a user profile of user 402 indicating social media interactions of user 402 and interactions of user 402 with the media guidance application. For example, the user profile of user 402 may indicate that user 402 liked "Ned Stark" (the character played by entity 418) on social media. In some embodiments, the media guidance application may generate for display prompt 430 based on the data indicating that user 402 liked "Ned Stark" on social media. For example, the media guidance application may choose to include entity 418 as the first potential disambiguation of the ambiguous entity because user 418 liked the character that entity 418 plays in the media asset on social media and did not like the character that entity 446 played in the media asset.

In some embodiments, the media guidance application may gather additional data by retrieving, from a database, an indication of a social media popularity of entity 418 and a social media popularity of entity 446. For example, the media guidance application may receive an indication that entity 418 has 2 million likes on social media, and entity 446 has 1 million likes on social media. In some embodiments, the media guidance application may generate for display prompt 430 based on the indication. For example, the media guidance application may choose entity 418 to include in prompt 430 as the first potential disambiguation of the ambiguous entity because entity 418 has more likes on social media than does entity 446.

In some embodiments, the media guidance application may gather additional data by receiving, from a database, a knowledge graph. In some embodiments, the media guidance application may determine that search query 422 includes a pronoun. For example, the media guidance application may determine that search query 422 contains the pronoun "he." In some embodiments, the media guidance application may retrieve, using the control circuitry, from the database, metadata associating the pronoun with a characteristic of a characteristic type. For example, "he" may be associated with the characteristic "male" of the characteristic type "gender." In some embodiments, the media guidance application may retrieve, from the database, metadata about entity 418 and metadata about entity 446. In some embodiments, the media guidance application may determine, based on the metadata about entity 418 and metadata about the entity 446, that entity 418 is associated with the characteristic and entity 446 is associated with a different characteristic of the characteristic type. For example, the media guidance application may determine that entity 418 (e.g., Sean Bean) is associated with the characteristic "male," but that entity 446 (e.g., Lena Headey) is associated with the characteristic "female" in the "gender" characteristic type. In some embodiments, the media guidance application may generate for display prompt 430 based on determining that entity 418 is associated with the characteristic and entity 446 is associated with a different characteristic of the characteristic type. For example, the media guidance application may choose entity 430 to include in prompt 430 as the first potential disambiguation of the ambiguous entity because "he" refers to "males," and entity 418 is a male and Lena Headey is a female.

In some embodiments, the media guidance application may gather additional data by receiving, using the control circuitry, data indicative of area 448, calculated based on gaze 444 of user 442 at the current time, from a user device of user 442. For example, user 402 and user 442 may be concurrently watching the media asset on display 414. In some embodiments, user 402 and user 442 may be watching media asset on two different displays. In some embodiments, the media guidance application may retrieve, from a database, information regarding a plurality of areas corresponding to gazes of a plurality of users who have, or who are currently, watching the media asset, who are local to user 402 or remote from user 442. The media guidance application may receive data indicating that user 402 was looking at area 448, and that area 448 was calculated based on gaze 444 of user 442 at 6:52 PM. In some embodiments, the media guidance application may determine that area 448 overlaps with the location of entity 418. The media guidance application may determine that the third area overlaps with the location of entity 418 in a similar manner as described above in relation to determining that area 116 overlaps with the location of the entity 118 in regards to FIG. 1. In some embodiments, the media guidance application may generate for display prompt 430 based on determining that area 448 overlaps with the location of the entity 418. If user 442 was also looking at entity 418, the media guidance application may determine that it is more likely that user 402 was looking at entity 418. In the case of multiple users, the media guidance application may include an entity that the most users were looking at in prompt 430.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 5:
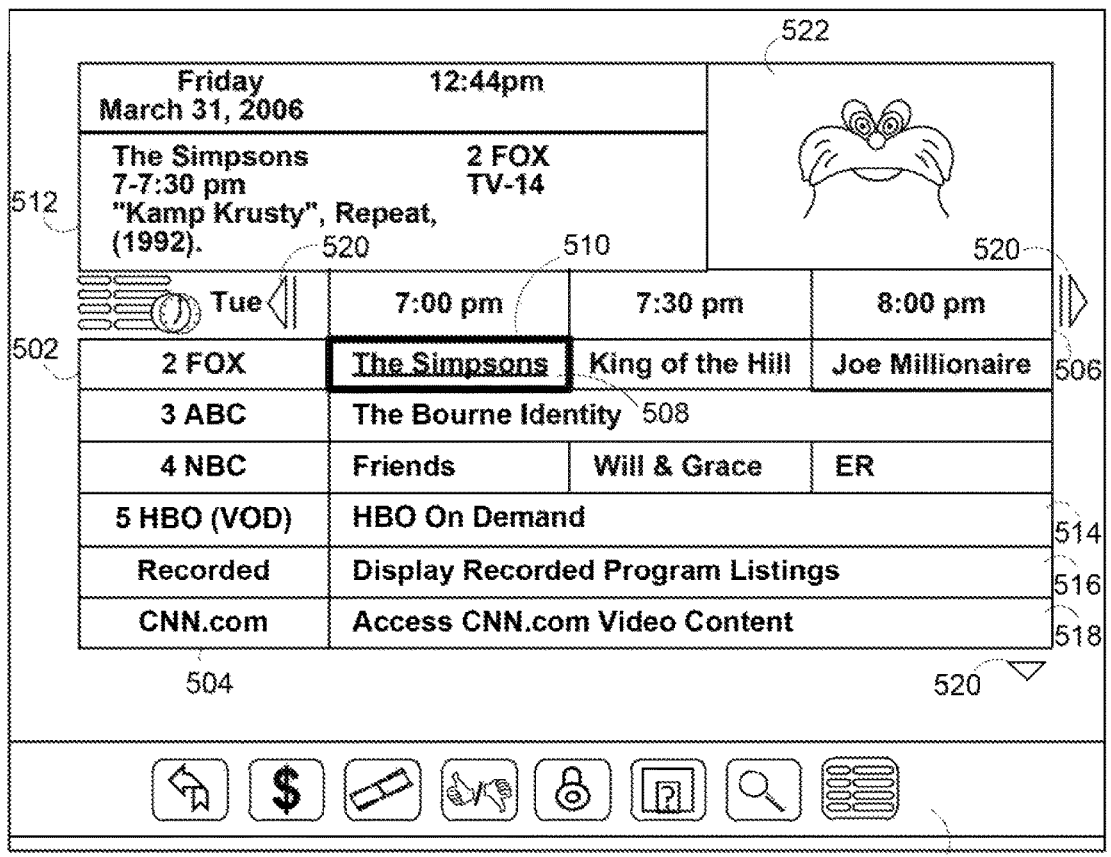
FIG. 5 shows an illustrative example of a display screen for use in accessing media content, in accordance with some embodiments of the disclosure.
Figure 6:
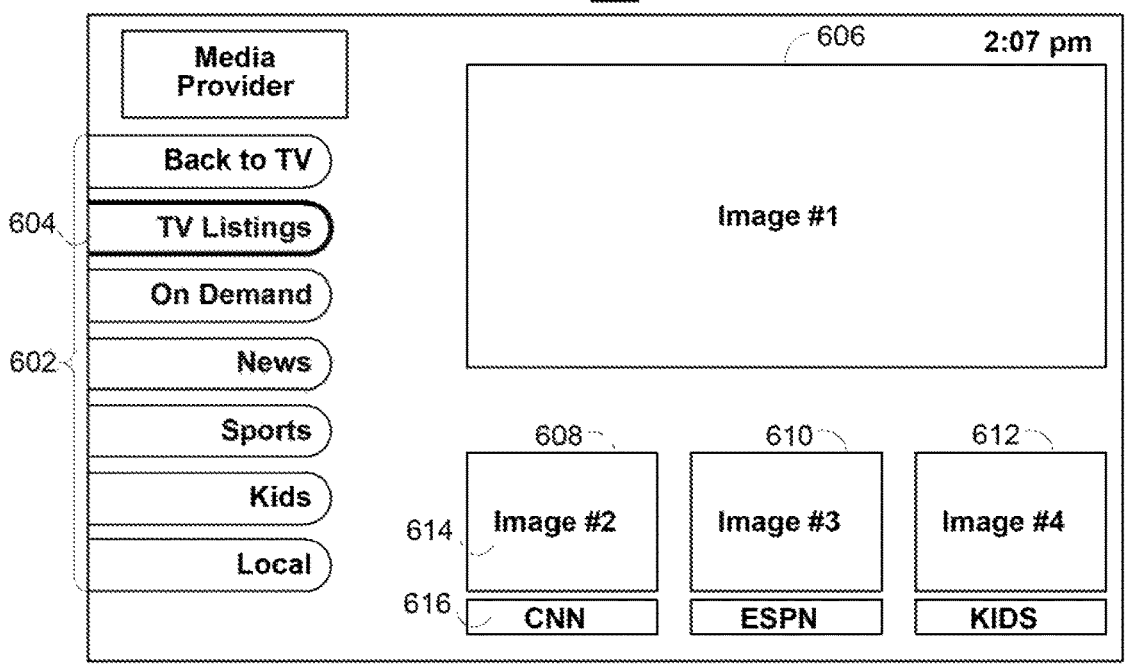
FIG. 6 shows another illustrative example of a display screen used in accessing media content, in accordance with some embodiments of the disclosure.

FIGS. 5-6 show illustrative display screens that may be used to provide media guidance data. The display screens shown in FIGS. 5-6 may be implemented on any suitable user equipment device or platform. While the displays of FIGS. 5-6 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 5 shows illustrative grid of a program listings display 500 arranged by time and channel that also enables access to different types of content in a single display. Display 500 may include grid 502 with: (1) a column of channel/content type identifiers 504, where each channel/content type identifier (which is a cell in the column) identifies a different channel or content type available; and (2) a row of time identifiers 506, where each time identifier (which is a cell in the row) identifies a time block of programming. Grid 502 also includes cells of program listings, such as program listing 508, where each listing provides the title of the program provided on the listing's associated channel and time. With a user input device, a user can select program listings by moving highlight region 510. Information relating to the program listing selected by highlight region 510 may be provided in program information region 512. Region 512 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 502 may provide media guidance data for non-linear programming including on-demand listing 514, recorded content listing 516, and Internet content listing 518. A display combining media guidance data for content from different types of content sources is sometimes referred to as a "mixed-media" display. Various permutations of the types of media guidance data that may be displayed that are different than display 500 may be based on user selection or guidance application definition (e.g., a display of only recorded and broadcast listings, only on-demand and broadcast listings, etc.). As illustrated, listings 514, 516, and 518 are shown as spanning the entire time block displayed in grid 502 to indicate that selection of these listings may provide access to a display dedicated to on-demand listings, recorded listings, or Internet listings, respectively. In some embodiments, listings for these content types may be included directly in grid 502. Additional media guidance data may be displayed in response to the user selecting one of the navigational icons 520. (Pressing an arrow key on a user input device may affect the display in a similar manner as selecting navigational icons 520.)

Display 500 may also include video region 522, and options region 526. Video region 522 may allow the user to view and/or preview programs that are currently available, will be available, or were available to the user. The content of video region 522 may correspond to, or be independent from, one of the listings displayed in grid 502. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 526 may allow the user to access different types of content, media guidance application displays, and/or media guidance application features. Options region 526 may be part of display 500 (and other display screens described herein), or may be invoked by a user by selecting an on-screen option or pressing a dedicated or assignable button on a user input device. The selectable options within options region 526 may concern features related to program listings in grid 502 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 8. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 6. Video mosaic display 600 includes selectable options 602 for content information organized based on content type, genre, and/or other organization criteria. In display 600, television listings option 604 is selected, thus providing listings 606, 608, 610, and 612 as broadcast program listings. In display 600 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 608 may include more than one portion, including media portion 614 and text portion 616. Media portion 614 and/or text portion 616 may be selectable to view content in full-screen or to view information related to the content displayed in media portion 614 (e.g., to view listings for the channel that the video is displayed on).

The listings in display 600 are of different sizes (i.e., listing 606 is larger than listings 608, 610, and 612), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 7:
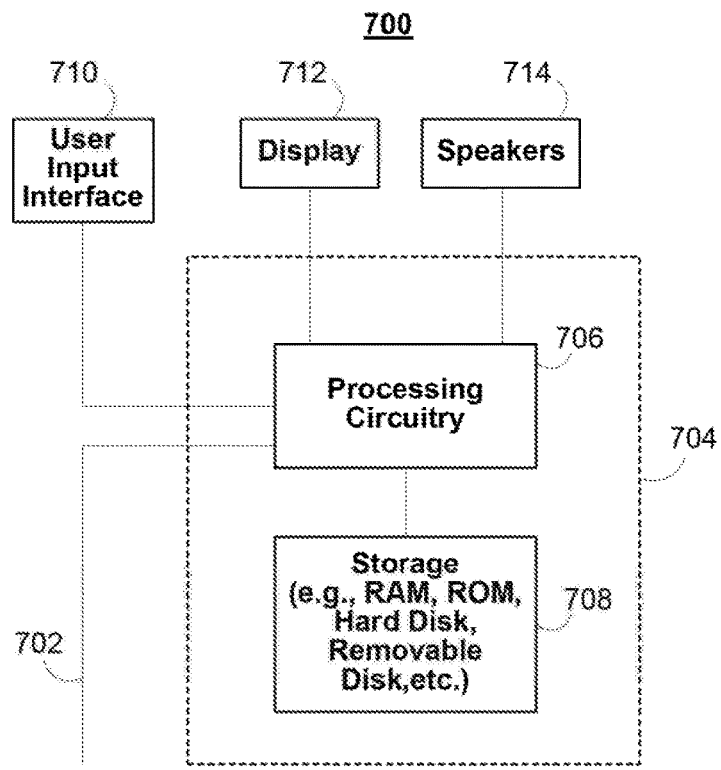
FIG. 7 is a block diagram of an illustrative user equipment device, in accordance with some embodiments of the disclosure.

Users may access content and the media guidance application (and its display screens described above and below) from one or more of their user equipment devices. FIG. 7 shows a generalized embodiment of illustrative user equipment device 700. More specific implementations of user equipment devices are discussed below in connection with FIG. 8. User equipment device 700 may receive content and data via input/output (hereinafter "I/O") path 702. I/O path 702 may provide content (e.g., broadcast programming, on-demand programming, Internet content, content available over a local area network (LAN) or wide area network (WAN), and/or other content) and data to control circuitry 704, which includes processing circuitry 706 and storage 708. Control circuitry 704 may be used to send and receive commands, requests, and other suitable data using I/O path 702. I/O path 702 may connect control circuitry 704 (and specifically processing circuitry 706) to one or more communications paths (described below). I/O functions may be provided by one or more of these communications paths, but are shown as a single path in FIG. 7 to avoid overcomplicating the drawing.

Control circuitry 704 may be based on any suitable processing circuitry such as processing circuitry 706. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 704 executes instructions for a media guidance application stored in memory (i.e., storage 708). Specifically, control circuitry 704 may be instructed by the media guidance application to perform the functions discussed above and below. For example, the media guidance application may provide instructions to control circuitry 704 to generate the media guidance displays. In some implementations, any action performed by control circuitry 704 may be based on instructions received from the media guidance application.

In client-server based embodiments, control circuitry 704 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 8). In addition, communications circuitry may include circuitry that enables peer-to-peer communication of user equipment devices, or communication of user equipment devices in locations remote from each other (described in more detail below).

Memory may be an electronic storage device provided as storage 708 that is part of control circuitry 704. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 708 may be used to store various types of content described herein as well as media guidance data described above. Nonvolatile memory may also be used (e.g., to launch a boot-up routine and other instructions). Cloud-based storage, described in relation to FIG. 8, may be used to supplement storage 708 or instead of storage 708.

Control circuitry 704 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 704 may also include scaler circuitry for upconverting and downconverting content into the preferred output format of the user equipment 700. Circuitry 704 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 708 is provided as a separate device from user equipment 700, the tuning and encoding circuitry (including multiple tuners) may be associated with storage 708.

A user may send instructions to control circuitry 704 using user input interface 710. User input interface 710 may be any suitable user interface, such as a remote control, mouse, trackball, keypad, keyboard, touch screen, touchpad, stylus input, joystick, voice recognition interface, or other user input interfaces. Display 712 may be provided as a stand-alone device or integrated with other elements of user equipment device 700. For example, display 712 may be a touchscreen or touch-sensitive display. In such circumstances, user input interface 710 may be integrated with or combined with display 712. Display 712 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 712 may be HDTV-capable. In some embodiments, display 712 may be a 3D display, and the interactive media guidance application and any suitable content may be displayed in 3D. A video card or graphics card may generate the output to the display 712. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 704. The video card may be integrated with the control circuitry 704. Speakers 714 may be provided as integrated with other elements of user equipment device 700 or may be stand-alone units. The audio component of videos and other content displayed on display 712 may be played through speakers 714. In some embodiments, the audio may be distributed to a receiver (not shown), which processes and outputs the audio via speakers 714.

The guidance application may be implemented using any suitable architecture. For example, it may be a stand-alone application wholly-implemented on user equipment device 700. In such an approach, instructions of the application are stored locally (e.g., in storage 708), and data for use by the application is downloaded on a periodic basis (e.g., from an out-of-band feed, from an Internet resource, or using another suitable approach). Control circuitry 704 may retrieve instructions of the application from storage 708 and process the instructions to generate any of the displays discussed herein. Based on the processed instructions, control circuitry 704 may determine what action to perform when input is received from input interface 710. For example, movement of a cursor on a display up/down may be indicated by the processed instructions when input interface 710 indicates that an up/down button was selected.

In some embodiments, the media guidance application is a client-server based application. Data for use by a thick or thin client implemented on user equipment device 700 is retrieved on-demand by issuing requests to a server remote to the user equipment device 700. In one example of a client-server based guidance application, control circuitry 704 runs a web browser that interprets web pages provided by a remote server. For example, the remote server may store the instructions for the application in a storage device. The remote server may process the stored instructions using circuitry (e.g., control circuitry 704) and generate the displays discussed above and below. The client device may receive the displays generated by the remote server and may display the content of the displays locally on equipment device 700. This way, the processing of the instructions is performed remotely by the server while the resulting displays are provided locally on equipment device 700. Equipment device 700 may receive inputs from the user via input interface 710 and transmit those inputs to the remote server for processing and generating the corresponding displays. For example, equipment device 700 may transmit a communication to the remote server indicating that an up/down button was selected via input interface 710. The remote server may process instructions in accordance with that input and generate a display of the application corresponding to the input (e.g., a display that moves a cursor up/down). The generated display is then transmitted to equipment device 700 for presentation to the user.

In some embodiments, the media guidance application is downloaded and interpreted or otherwise run by an interpreter or virtual machine (run by control circuitry 704). In some embodiments, the guidance application may be encoded in the ETV Binary Interchange Format (EBIF), received by control circuitry 704 as part of a suitable feed, and interpreted by a user agent running on control circuitry 704. For example, the guidance application may be an EBIF application. In some embodiments, the guidance application may be defined by a series of JAVA-based files that are received and run by a local virtual machine or other suitable middleware executed by control circuitry 704. In some of such embodiments (e.g., those employing MPEG-2 or other digital media encoding schemes), the guidance application may be, for example, encoded and transmitted in an MPEG-2 object carousel with the MPEG audio and video packets of a program.

Figure 8:
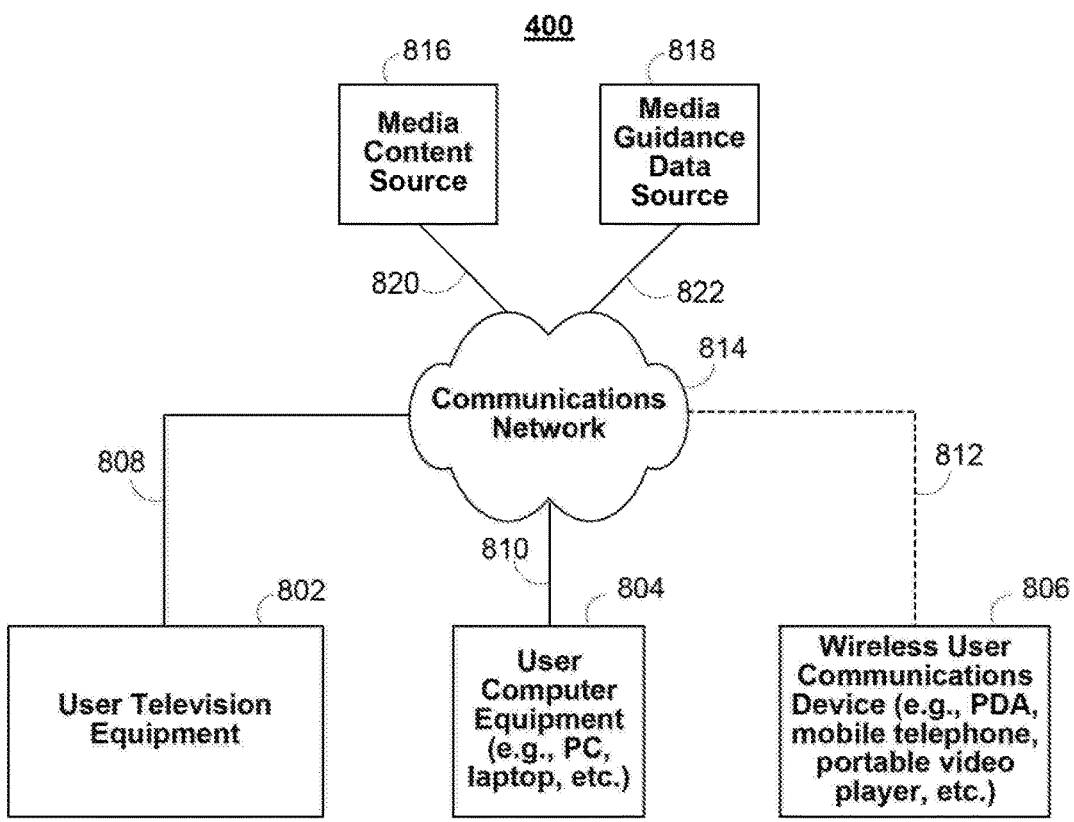
FIG. 8 is a block diagram of an illustrative media system, in accordance with some embodiments of the disclosure.

User equipment device 700 of FIG. 7 can be implemented in system 800 of FIG. 8 as user television equipment 802, user computer equipment 804, wireless user communications device 806, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 7 may not be classified solely as user television equipment 802, user computer equipment 804, or a wireless user communications device 806. For example, user television equipment 802 may, like some user computer equipment 804, be Internet-enabled allowing for access to Internet content, while user computer equipment 804 may, like some television equipment 802, include a tuner allowing for access to television programming. The media guidance application may have the same layout on various different types of user equipment or may be tailored to the display capabilities of the user equipment. For example, on user computer equipment 804, the guidance application may be provided as a web site accessed by a web browser. In another example, the guidance application may be scaled down for wireless user communications devices 806.

In system 800, there is typically more than one of each type of user equipment device but only one of each is shown in FIG. 8 to avoid overcomplicating the drawing. In addition, each user may utilize more than one type of user equipment device and also more than one of each type of user equipment device.

In some embodiments, a user equipment device (e.g., user television equipment 802, user computer equipment 804, wireless user communications device 806) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 814. Namely, user television equipment 802, user computer equipment 804, and wireless user communications device 806 are coupled to communications network 814 via communications paths 808, 810, and 812, respectively. Communications network 814 may be one or more networks including the Internet, a mobile phone network, mobile voice or data network (e.g., a 4G or LTE network), cable network, public switched telephone network, or other types of communications network or combinations of communications networks. Paths 808, 810, and 812 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 812 is drawn with dotted lines to indicate that in the exemplary embodiment shown in FIG. 8 it is a wireless path and paths 808 and 810 are drawn as solid lines to indicate they are wired paths (although these paths may be wireless paths, if desired). Communications with the user equipment devices may be provided by one or more of these communications paths, but are shown as a single path in FIG. 8 to avoid overcomplicating the drawing.

Although communications paths are not drawn between user equipment devices, these devices may communicate directly with each other via communication paths, such as those described above in connection with paths 808, 810, and 812, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 814.

System 800 includes content source 816 and media guidance data source 818 coupled to communications network 814 via communication paths 820 and 822, respectively. Paths 820 and 822 may include any of the communication paths described above in connection with paths 808, 810, and 812. Communications with the content source 816 and media guidance data source 818 may be exchanged over one or more communications paths, but are shown as a single path in FIG. 8 to avoid overcomplicating the drawing. In addition, there may be more than one of each of content source 816 and media guidance data source 818, but only one of each is shown in FIG. 8 to avoid overcomplicating the drawing. (The different types of each of these sources are discussed below.) If desired, content source 816 and media guidance data source 818 may be integrated as one source device. Although communications between sources 816 and 818 with user equipment devices 802, 804, and 806 are shown as through communications network 814, in some embodiments, sources 816 and 818 may communicate directly with user equipment devices 802, 804, and 806 via communication paths (not shown) such as those described above in connection with paths 808, 810, and 812.

Content source 816 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 816 may be the originator of content (e.g., a television broadcaster, a Webcast provider, etc.) or may not be the originator of content (e.g., an on-demand content provider, an Internet provider of content of broadcast programs for downloading, etc.). Content source 816 may include cable sources, satellite providers, on-demand providers, Internet providers, over-the-top content providers, or other providers of content. Content source 816 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 818 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 818 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 818 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 818 may provide user equipment devices 802, 804, and 806 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 708, and executed by control circuitry 704 of a user equipment device 700. In some embodiments, media guidance applications may be client-server applications where only a client application resides on the user equipment device, and server application resides on a remote server. For example, media guidance applications may be implemented partially as a client application on control circuitry 704 of user equipment device 700 and partially on a remote server as a server application (e.g., media guidance data source 818) running on control circuitry of the remote server. When executed by control circuitry of the remote server (such as media guidance data source 818), the media guidance application may instruct the control circuitry to generate the guidance application displays and transmit the generated displays to the user equipment devices. The server application may instruct the control circuitry of the media guidance data source 818 to transmit data for storage on the user equipment. The client application may instruct control circuitry of the receiving user equipment to generate the guidance application displays.

Content and/or media guidance data delivered to user equipment devices 802, 804, and 806 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 800 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 8.

In one approach, user equipment devices may communicate with each other within a home network. User equipment devices can communicate with each other directly via short-range point-to-point communication schemes described above, via indirect paths through a hub or other similar device provided on a home network, or via communications network 814. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 816 to access content. Specifically, within a home, users of user television equipment 802 and user computer equipment 804 may access the media guidance application to navigate among and locate desirable content. Users may also access the media guidance application outside of the home using wireless user communications devices 806 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 814. These cloud resources may include one or more content sources 816 and one or more media guidance data sources 818. In addition or in the alternative, the remote computing sites may include other user equipment devices, such as user television equipment 802, user computer equipment 804, and wireless user communications device 806. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 804 or wireless user communications device 806 having content capture feature. Alternatively, the user can first transfer the content to a user equipment device, such as user computer equipment 804. The user equipment device storing the content uploads the content to the cloud using a data transmission service on communications network 814. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 7.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 9:
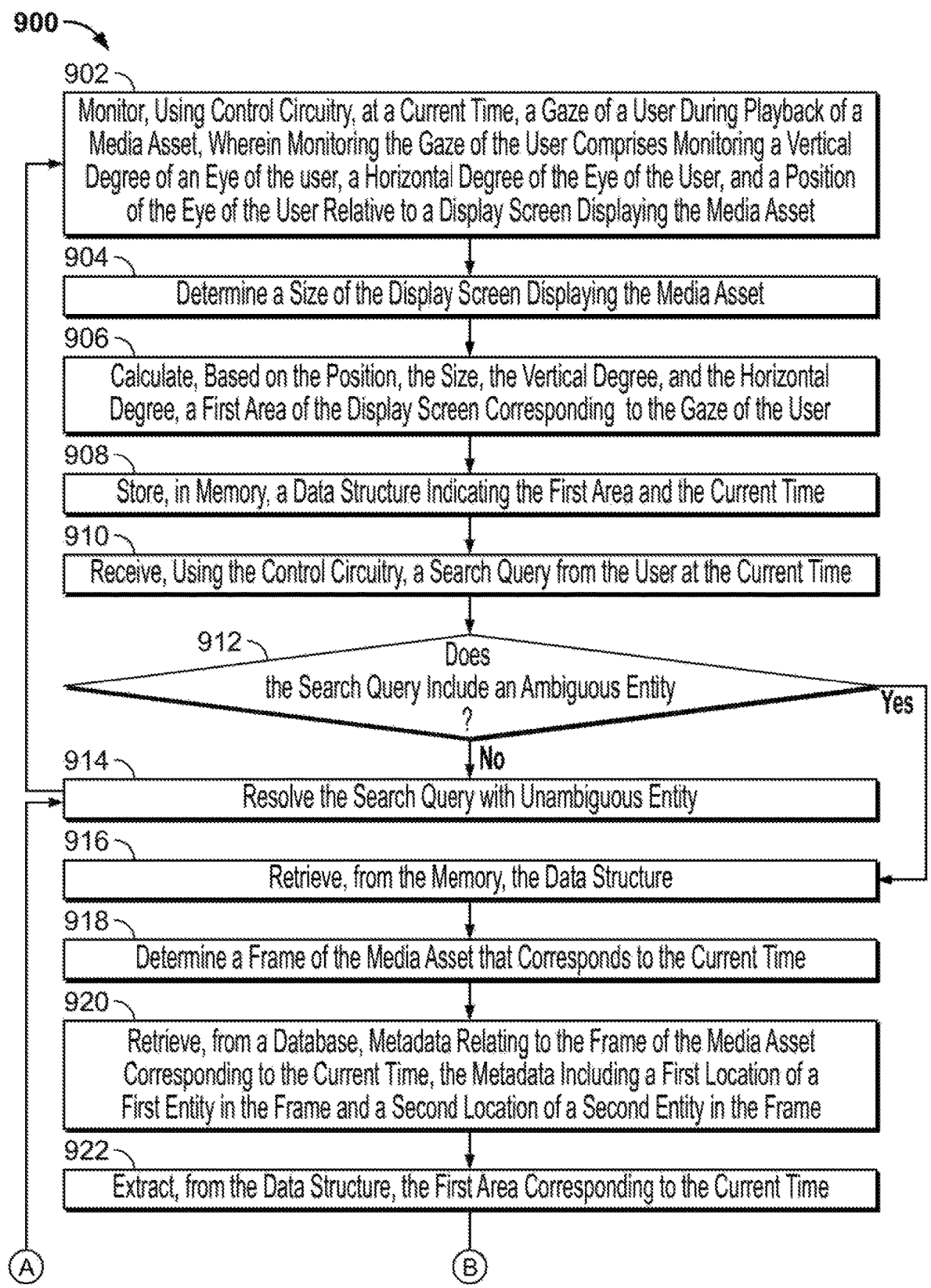
FIG. 9 is a flowchart of illustrative steps for disambiguating an ambiguous entity in a search query based on the gaze of a user, in accordance with some embodiments of the disclosure.
Figure 9:
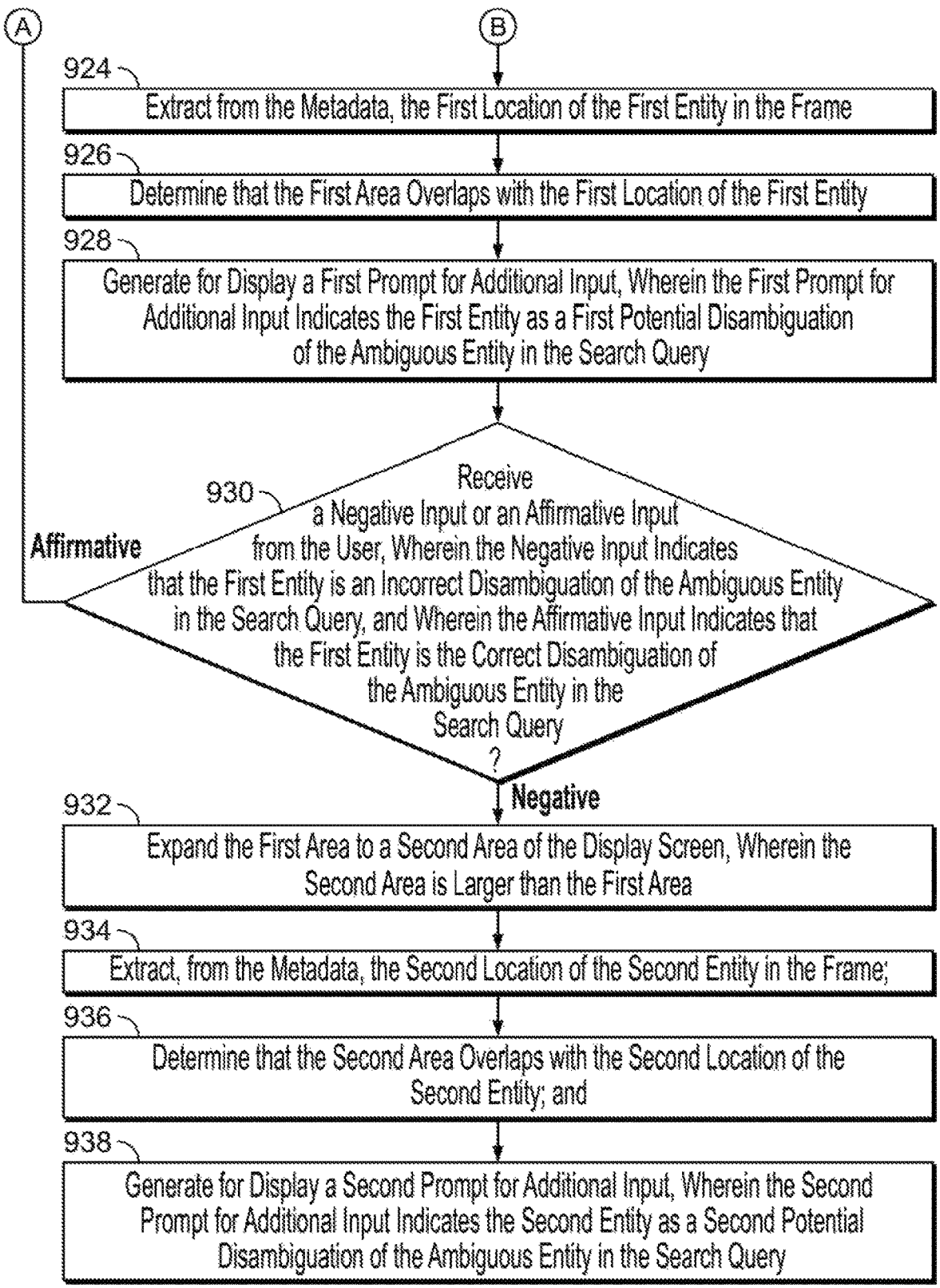

FIG. 9 is a flowchart of illustrative steps for disambiguating an ambiguous entity in a search query based on the gaze of a user, in accordance with some embodiments of the disclosure. For example, a media guidance application may instruction control circuitry 706 to execute the elements of process 900.

Process 900 begins at 902, where the media guidance application monitors (e.g., via control circuitry 706) a gaze of a user during playback (e.g., on display 712) of a media asset (e.g., received from media content source 816). The media guidance application may monitor (e.g., via control circuitry 706) the gaze of the user by monitoring a vertical degree of an eye of the user, a horizontal degree of the eye of the user, and a position of the eye of the user relative to a display screen. For example, the media guidance application may use a camera (e.g., detector 112) to determine that the eye of the user is six feet (e.g., distance 124) from a screen (e.g., display 712) playing "Baelor," and that the eye of the user is aligned with the center of the screen at 6:52 PM. The media guidance application may determine (e.g., via control circuitry 706) that the eye of the user is at a horizontal angle of 8 degrees to the left of center and that the eye of the user is at a vertical angle of 5 degrees above center.

Process 900 continues to 904, where the media guidance application determines (e.g., via control circuitry 706) a size of the display screen (e.g., display 712) displaying the media asset. For example, the media guidance application may determine that the display screen (e.g., display 712) displaying "Baelor" is a 42 inch television, and has dimensions of 20.6 inches (e.g., width 228) by 36.6 inches (e.g. height 126).

Process 900 continues to 906, where the media guidance application calculates (e.g., via control circuitry 706), based on the position, the size, the vertical degree, and the horizontal degree, a first area (e.g., area 116) of the display screen (e.g., display 712) corresponding to the gaze of the user. In some embodiments, the media guidance application may assume (e.g., via control circuitry 706) that the first area (e.g., area 116) is defined as a circle centered on the point corresponding to the gaze of the user, for example, about 10 inches left of the center of the television and 6 inches above the center of the display screen. The circle may be any suitable radius, for example, three inches. For example, the media guidance application may calculate (e.g., via control circuitry 706) the point corresponding to the gaze of the user using the following formulas: $x_{gaze\ 108}=x_{eye}+$(distance 124)*tan (horizontal angle) and $y_{gaze\ 108}=y_{eye}+$(distance 124)*tan (vertical angle 110). In other embodiments, the media guidance application may determine (e.g., via control circuitry 706) a plurality of horizontal and vertical angles at which the user's eyes paused or changed directions (i.e., fixation points) in a similar manner to calculating the point that corresponds to the gaze of the user, and use those points to define the edges or vertices of the outer bound of the first area.

Process 900 continues to 908, where the media guidance application may store (e.g., via control circuitry 706), in memory (e.g., storage 708), a data structure indicating the first area and the current time. For example, the media guidance application may store (e.g., via control circuitry 706) a data structure with a field with an indication of the first area and a field with an indication of the current time (e.g., 6:52 PM).

Process 900 continues to 910, where the media guidance application receives (e.g., via control circuitry 706), a search query (e.g., search query 122) from the user at the current time. For example, the media guidance application may determine (e.g., via control circuitry 706) that the user said "How old is he?" using a microphone (e.g., detector 112) at 6:52 PM.

Process 900 continues to 912, where the media guidance application determines (e.g., via control circuitry 706) whether the search query includes an ambiguous entity. If the media guidance application determines (e.g., via control circuitry 706) that the search query does not include an ambiguous entity (e.g., if the search query is "How old is Jack Gleeson" or "Jack Gleeson, how old is he?"), process continues to 914, where the media guidance application resolves (e.g., via control circuitry 706) the search query. For example, the media guidance application may query (e.g., via control circuitry 706 over communications network 814) a database (e.g., media guidance data source) for the answer to the search query. The media guidance application may receive (e.g., via control circuitry 706 over communications network 814) data packets that contain the answer to the search query.

The media guidance application may determine (e.g., via control circuitry 706) that the search query includes an ambiguous entity. For example, the media guidance application (e.g., via control circuitry 706) may determine that the word "he" is a pronoun that refers to a human or animal entity by referencing a database (e.g., media guidance data source 818) of pronouns. The media guidance application may thus determine (e.g., via control circuitry 706) that the pronoun "he" in the search query "How old is he?" refers to an ambiguous entity. More details regarding determining that the search query includes an ambiguous entity are described below in FIG. 12.

If the media guidance application determines that the search query includes an ambiguous entity, process 900 continues to 916 where the media guidance application retrieves (e.g., via control circuitry 706), from the memory (e.g., storage 708), the data structure indicating the first area and the current time. For example, the media guidance application may query (e.g., via control circuitry 706) the memory (e.g., storage 708) for the data structure and receive the data structure in return.

Process 900 continues to 918, where the media guidance application determines a frame of the media asset that corresponds to the current time. For example, the media guidance may extract (e.g., via control circuitry 706), by executing an SQL script utilizing the declarative "Select" command, the current time from the data structure. The media guidance application may then retrieve a viewing log (e.g., from storage 708), the viewing log indicating the user's interactions with "Baelor." The media guidance application may determine (e.g., via control circuitry 706) that the viewing log indicates that the user started watching "Baelor" at 6:00 PM and has not stopped or paused "Baelor" since. The media guidance application may determine (e.g., via control circuitry 706) that 6:52 PM corresponds to the frame occurring at the fifty-second minute of "Baelor" based on the viewing log.

Process 900 continues to 920, where the media guidance application retrieves (e.g., via control circuitry 706), from a database (e.g., from media guidance data source 818 over communications network 814), metadata relating to the frame of the media asset that corresponds to the current time. The metadata may include a first location of a first entity (e.g., entity 218) in the frame and a second location of a second entity (e.g., entity 220) in the frame. For example, the media guidance application may transmit (e.g., via control circuitry 706) a signal (e.g., over communications network 814), to the database (e.g., media guidance data source), requesting the metadata relating to the frame occurring at the fifty-second minute of "Baelor" and receive (e.g., via control circuitry 706 over communications network 814) the metadata in return. The metadata may include the location of the Sean Bean (i.e., the first entity) (e.g., entity 218) in the frame occurring at the fifty-second minute of "Baelor" and the location of Jack Gleeson (i.e., the second entity) (e.g., entity 220) in the same frame. In some embodiments, the first entity and the second entity may be at least one of an actor, an actress, an object, an animal, and a character. The metadata may indicate the first location of the first entity in the frame in any suitable manner, as described above in relation to as described above in relation to indicating the location of entity 118 and the location of the third entity in the frame occurring at the fiftieth minute of "Baelor" in relation to FIG. 1.

Process 900 continues to 922, where the media guidance application may extract (e.g., via control circuitry 706), from the data structure, the first area (e.g., area 216) corresponding to the current time. For example, the media guidance application may extract (e.g., via control circuitry 706), by executing an SQL script utilizing the declarative "Select" command, the first area and determine (e.g., via control circuitry 706) that the first area is the area outlined by a circle with a radius of three inches centered at 10 inches left of center and 6 inches above center of the display screen.

Process 900 continues to 924, where the media guidance application may extract (e.g., via control circuitry 706), from the metadata, the first location of the first entity in the frame. For example, the media guidance application may extract (e.g., via control circuitry 706), by executing an SQL script utilizing the declarative "Select" command, the first location from the metadata and determine (e.g., via control circuitry 706) that the location of Sean Bean (e.g., entity 218) in the frame may be defined by a bounding box, the upper left corner of the bounding box at 10 inches left of center and 9 inches above center, and the lower right corner of the bounding box at 7 inches left of center and 5 inches above center.

Process 900 continues to 926, where the media guidance application determines (e.g., via control circuitry 706) that the first area overlaps with the first location of the first entity in the frame. For example, the media guidance application may determine (e.g., via control circuitry 706) that the first area (e.g., area 216) overlaps with the first location of the first entity (e.g., the location of entity 218) in a manner similar to as described above with respect to determining that area 216 overlaps with the location of entity 218 with regards to FIG. 2.

Process 900 continues to 928 where the media guidance application generates (e.g., via control circuitry 706) for display (e.g., on display 712) a first prompt for additional input (e.g., prompt 230). The first prompt for additional input may indicate that the first entity as a first potential disambiguation of the ambiguous entity in the search query. For example, the media guidance application may generate (e.g., via control circuitry 706) for display (e.g., on display 712) the first prompt for additional input (e.g., prompt 230) by generating for display a text box containing "Did you mean Sean Bean?" In some embodiments, instead of generating for display the first prompt for additional input, the media guidance application may issue (e.g., via control circuitry 706) the first prompt for additional input verbally by issuing "Did you mean Sean Bean?" verbally (e.g. via speakers 714).

Process 900 continues to 930, where, the media guidance application may receive (e.g., via control circuitry 706) a negative input or an affirmative input from the user subsequent to generating for display the first prompt for additional input. The negative input (e.g., negative input 222) indicates that the first entity is an incorrect disambiguation of the ambiguous entity in the search query (e.g., search query 122). The affirmative input (e.g., affirmative input 322) indicates that the first entity is the correct disambiguation of the ambiguous entity in the search query. For example, the media guidance application may receive an affirmative input by detecting (e.g., via control circuitry 706) the user say "Yes!" to indicate that the user was asking for the age of Sean Bean (e.g., the first entity). If the media guidance application receives (e.g., via control circuitry 706) the affirmative input, process 900 continues to 914, where the media guidance application resolves the search query with the first entity as the ambiguous entity.

If the media guidance application receives (e.g., via control circuitry 706) the negative input (e.g., by detecting (e.g., via control circuitry 706) the user say "No. The other one."), process 900 continues to 932, where the media guidance application may expand (e.g., via control circuitry 706) the first area to a second area of the display screen (e.g., display 712), the second area being larger than the first area. For example, the media guidance application may expand (e.g., via control circuitry 706) the first area (e.g. area 316), a circle centered at 10 inches left of center and 6 inches above center with a radius of 3 inches, to a second area (e.g., area 332), a circle centered at 10 inches left of center and 6 inches above center with a radius of 6 inches.

Process 900 continues to 934, where the media guidance application extracts (e.g., via control circuitry 706), from the metadata, the second location of the second entity in the frame corresponding to the current time. For example, the media guidance application may extract (e.g., via control circuitry 706), by executing an SQL script utilizing the declarative "Select" command, the second location of the second entity (e.g., entity 320) in the frame, and determine that the second location of the second entity in the frame may be defined by a bounding box, the upper left corner of the bounding box at 5 inches left of the center of the display screen (e.g., display 712) and 7 inches above the center of the display screen, and the lower right corner of the bounding box at 2 inches left of the center of the display screen and 3 inches above the center of the display screen.

Process 900 continues to 936, where the media guidance application determines (e.g., via control circuitry 706) that the second area overlaps with the second location of the second entity. The media guidance application may determine (e.g., via control circuitry 706) that the second area (e.g., area 332) overlaps with the second location of the second entity (e.g., entity 320) in a manner similar to as described above with respect to determining that area 216 overlaps with the location of entity 218 with regards to FIG. 2.

Process 900 continues to 938, where, based on determining that the second area overlaps with the second location of the second entity in the frame, the media guidance application generates (e.g., via control circuitry 706) for display (e.g., on display 712) a second prompt for additional input. The second prompt for additional input (e.g., prompt 330) indicates the second entity as a second potential disambiguation of the ambiguous entity in the search query (e.g., search query 122). For example, the media guidance application may generate (e.g., via control circuitry 706) for display (e.g., on display 712) the second prompt for additional input (e.g., prompt 330) by generating for display a text box containing "Did you mean Jack Gleeson?" In some embodiments, instead of generating for display the second prompt for additional input, the media guidance application may issue (e.g., via control circuitry 706) the second prompt for additional input verbally by issuing "Did you mean Jack Gleeson?" verbally (e.g., via speakers 714).

Figure 10:
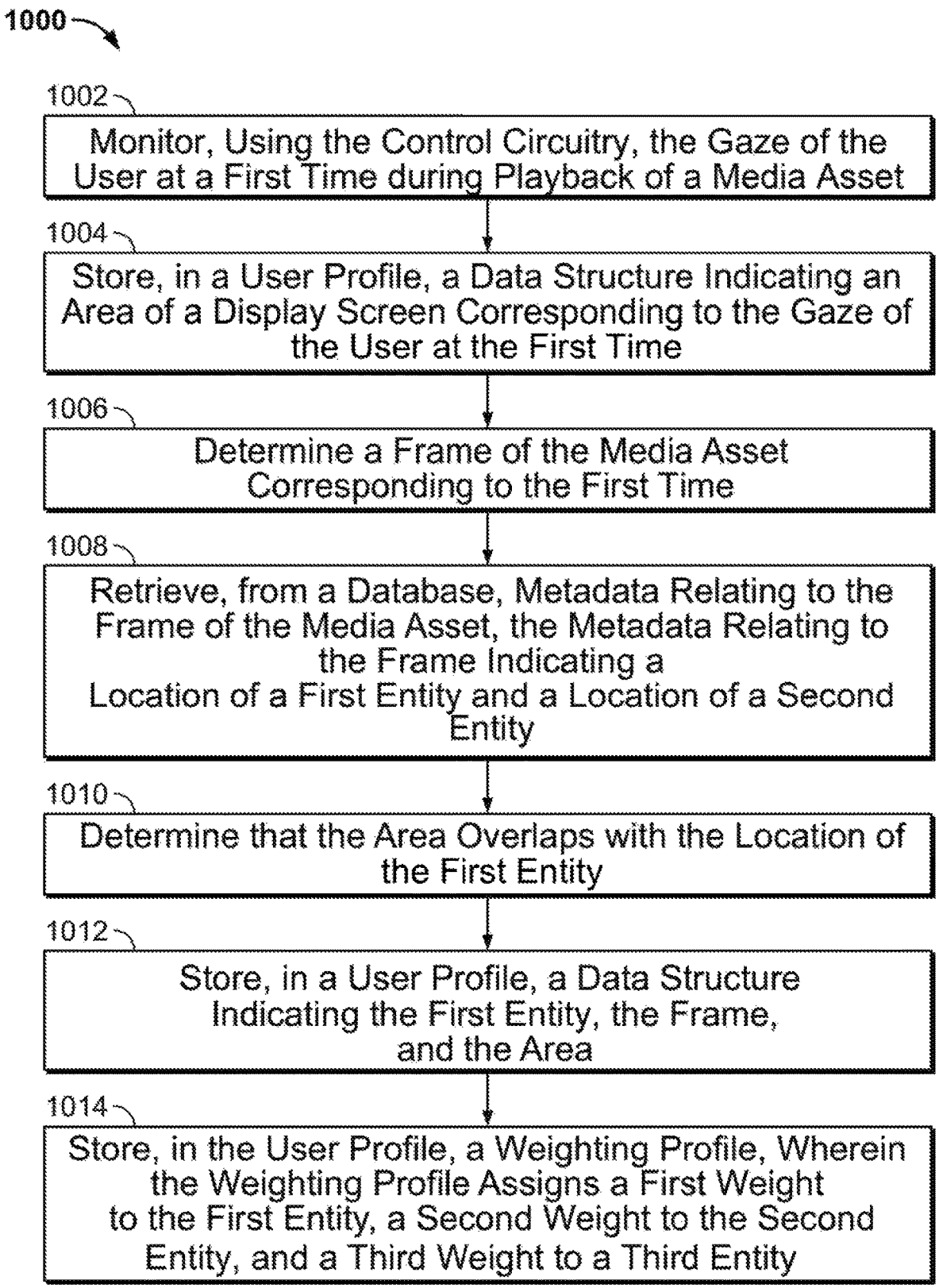
FIG. 10 is a flowchart of illustrative steps for creating a user profile based on the gaze of a user, in accordance with some embodiments of the disclosure.

FIG. 10 is a flowchart of illustrative steps for creating a user profile based on the gaze of a user, in accordance with some embodiments of the disclosure. For example, a media guidance application may instruction control circuitry 706 to execute the elements of process 1000.

Process 1000 begins at 1002, where the media guidance application monitors (e.g., via control circuitry 706) the gaze of the user at a first time during playback of a media asset. For example, the media guidance application may monitor the gaze of the user at 6:50 PM while the user is viewing "Baelor" in a similar manner as described in relation to using detector 112 to monitor gaze 108 of user 102 in regards to FIG. 1 above.

Process 1000 continues to 1004, where the media guidance application may store (e.g., via control circuitry 706), in a user profile (e.g., in storage 708 or at media guidance data source 818), a data structure indicating an area of a display screen corresponding to the gaze of the user at the first time. For example, the data structure may indicate the area (e.g., area 116) of the screen corresponding to the gaze (e.g., gaze 108) of the user (e.g., user 108) at 6:50 PM. The media guidance application may determine (e.g., via control circuitry 706) the area in a manner similar to as described above in relation to determining the first area in 906 of process 900 of FIG. 9.

Process 1000 continues to 1006, where the media guidance application determines (e.g., via control circuitry 706), a frame of the media asset corresponding to the first time. For example, the media guidance application may determine (e.g., via control circuitry 706) that the frame is the frame occurring at the fiftieth minute of "Baelor" in a similar manner to as described in relation to determining the frame of the media asset that corresponds to the current time in relation to 918 of process 918 in FIG. 9.

Process 1000 continues to 1008, where the media guidance application retrieves (e.g., via control circuitry 706), from a database (e.g., media guidance data source 818), metadata relating to the frame of the media asset indicating a location of a first entity and a location of a second entity in the frame corresponding to the first time. For example, the media guidance application may retrieve (e.g., via control circuitry 706) the metadata relating to the frame at the fiftieth minute of "Baelor" from the database (e.g., from media guidance data source 818) in a similar manner to as described above in relation to retrieving the metadata corresponding to the current time in 920 of process 900 in FIG.

9. The media guidance application may determine (e.g., via control circuitry 706) that the metadata relating to the frame at the fiftieth minute of "Baelor" indicates the location of Sean Bean (e.g., entity 118) and indicates the location of Lena Headey (e.g., entity 446) in the frame at the fiftieth minute of "Baelor."

Process 1000 continues to 1010, where the media guidance application determines (e.g., via control circuitry 706) that the area overlaps with the location of the first entity in the frame corresponding to the first time. For example, the media guidance application may extract, by executing an SQL script utilizing the declarative "Select" command, the area from the data structure and determine (e.g., via control circuitry 706) determine that the area overlaps with the location of Sean Bean (e.g., entity 118) in the frame at the fiftieth minute of "Baelor" in a manner similar to as described above with respect to determining that area 216 overlaps with the location of entity 218 with regards to FIG. 2.

Process 1000 continues to 1012, where the media guidance application stores (e.g., via control circuitry 706), in the user profile (e.g., in storage 708 or media guidance data source 818), a data structure indicating the first entity, the frame corresponding to the first time, and the area. For example, the media guidance application may store (e.g., via control circuitry 706 in storage 708 or media guidance data source 818) a data structure indicating Sean Bean (e.g., entity 418), the frame at the fiftieth minute of "Baelor," and the area in the user profile.

Process 1000 continues to 1014, where the media guidance application stores (e.g., via control circuitry 706), in the user profile (e.g., in storage 708 or media guidance data source 818) a weighting profile. The media guidance application may assign (e.g., via control circuitry 706), in the weighting profile, a first weight to the first entity (e.g., entity 118), a second weight to the second entity (e.g., entity 446), and a third weight to a third entity (e.g., entity 120). For example, the media guidance application may store (e.g., via control circuitry 706 in storage 708 or media guidance data source 818) a weighting profile with fields indicating the entity and the weight assigned to the entity. For example, the media guidance application may store a weighting profile indicating that Sean Bean (e.g., entity 118) is assigned a weight of 40%, Jack Gleeson (e.g., entity 120) is assigned a weight of 30%, and Lena Headey (e.g., entity 446) is assigned a weight of 30%, based on the area (e.g., area 116) overlapping with the location of Sean Bean in the frame at the fiftieth minute of "Baelor." The weighting profile may indicate, for example, how often a user (e.g., user 102) has viewed each of the entities, how much time the user has spent looking at each of the entities, or how important each of the entities is to the user.

Figure 11:
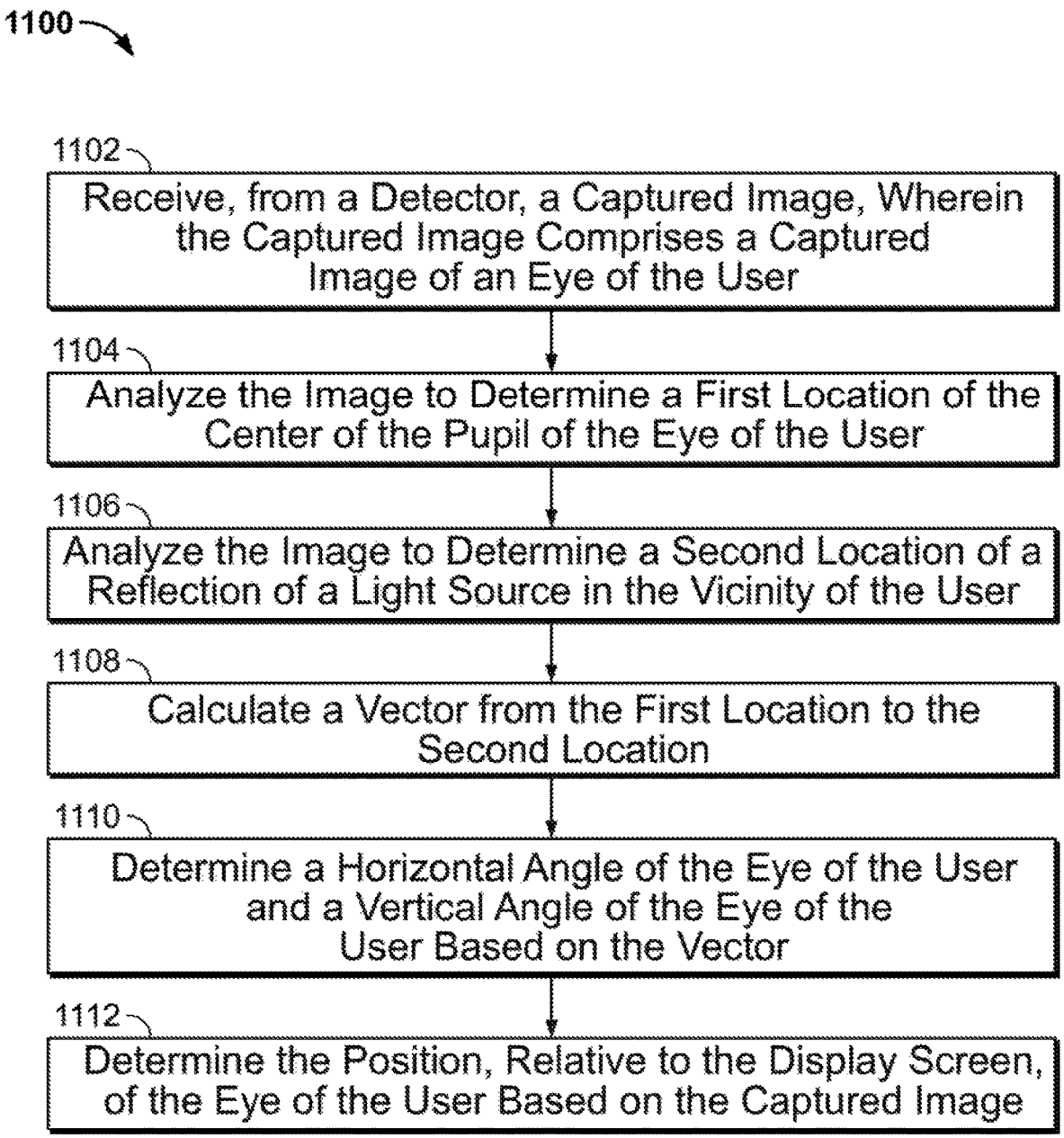
FIG. 11 is a flowchart of illustrative steps for monitoring the gaze of a user, in accordance with some embodiments of the disclosure.

FIG. 11 is a flowchart of illustrative steps for monitoring the gaze of a user, in accordance with some embodiments of the disclosure. For example, a media guidance application may instruction control circuitry 706 to execute the elements of process 1100.

Process 1100 begins at 1102, where the media guidance application receives (e.g., via control circuitry 706), from a detector (e.g., detector 112), a captured image, wherein the captured image comprises a captured image of an eye (e.g., eye 104) of the user (e.g., user 102). The detector may be a camera, an infrared detector, contact lens detector, wearable camera, wearable technology, optical sensor, or any other suitable detector for determining the motion/angle of the eye and a position of the eye. The media guidance application may receive (e.g., via control circuitry 706 over path 702) a picture of just the eye, the whole face of the user, or a whole room, and may use (e.g., via control circuitry 706) image recognition software to determine where in the image the eye of the user is.

Process 1100 continues to 1104, where the media guidance application analyzes the image to determine a first location of the center of the pupil of the eye (e.g., eye 102) of the user (e.g., user 102). For example, the media guidance application may run (e.g., via control circuitry 706) a contrast analysis on the location of the image where the eye of the user is to determine the outline of the pupil of the eye. The media guidance application may then determine (e.g., via control circuitry 706) the center of the outline of the shape of the outline of the pupil of the eye using an image analysis program or mathematical analysis engine.

Process 1100 continues to 1106, where the media guidance application analyzes (e.g., via control circuitry 706) the image to determine a second location of a reflection of a light source in the vicinity of the user. For example, the detector (e.g., detector 112) may emit an infrared light aimed at the eye of the user. The media guidance application may run (e.g., via control circuitry 706) a contrast analysis on the image (which may be an infrared image of the eye) to determine where the reflection of the infrared light occurred in the eye (e.g., eye 104) of the user (e.g., user 102). In some embodiments, the media guidance application may determine (e.g., via control circuitry 706) the location of a visible-spectrum light in the vicinity of the user, and determine (e.g., via control circuitry 706) the location of the reflection of the visible spectrum light in the eye of the user.

Process 1100 continues to 1108, where the media guidance application calculates (e.g., via control circuitry 706) a vector from the first location to the second location. For example, the media guidance application may run (e.g., via control circuitry 706) a mathematical analysis of the image to determine a magnitude and direction of the horizontal component of the vector and a magnitude and direction of the vertical component of the vector in the image.

Process 1100 continues to 1110, where the media guidance application determines (e.g., via control circuitry 706) a horizontal angle (e.g., horizontal angle 210) of the eye of the user and a vertical angle (e.g., vertical angle 110) of the eye of the user based on the vector. For example, the media guidance application may determine (e.g., via control circuitry 706), using a mathematical algorithm, that the horizontal angle is 8 degrees left of center (e.g., of reference gaze 106) and that the vertical angle is 5 degrees above center.

Process 1100 continues to 1112, where the media guidance application determines (e.g., via control circuitry 706) the position, relative to a display screen (e.g., display 114), of the eye of the user based on the captured image. For example, if the captured image is captured using a camera (e.g., detector 112), the media guidance application determine (e.g., via control circuitry 706) a reference point in the room to determine the position of the eye (e.g., eye 104) relative to the reference point. Using this position, the media guidance application may determine (e.g., via control circuitry 706), using an stored algorithm, based on the position of the eye relative to the reference point, and a position of the reference point from the display screen (e.g., display 114), determine the position of the eye relative to the display screen. Additionally or alternatively, the media guidance application may retrieve (e.g., via control circuitry 706 from media guidance data source 818) an average size of the head of a human to model the size of the head of the user, and based on this information, determine the position of the eye relative to the display screen, including the distance (e.g., distance 124) from the display screen. Additionally or alternatively, the media guidance application may receive (e.g., via control circuitry 706 via path 702) a second image from a second detector to determine the position of the eye relative to the display screen. For example, the media guidance application may determine (e.g., via control circuitry 706) that the eye of the user is located at a distance of six feet (e.g., distance 124) from the display screen (e.g., display 114) playing the media asset "Baelor," and that the eye is aligned with the center of the display screen (e.g., display 114).

Figure 12:
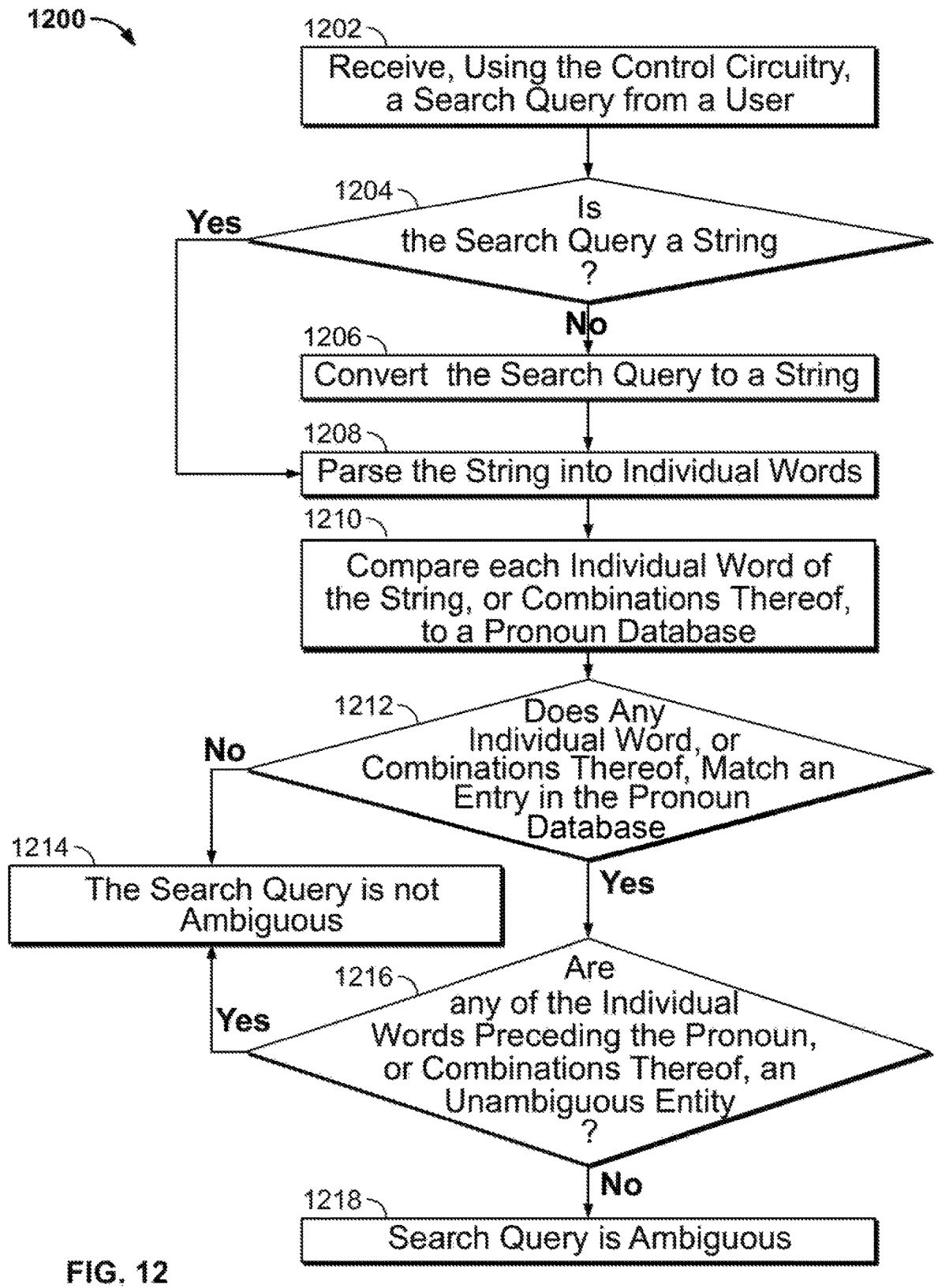
FIG. 12 is a flowchart of illustrative steps for determining that a search query includes an ambiguous entity, in accordance with some embodiments of the disclosure.

FIG. 12 is a flowchart of illustrative steps for determining that a search query includes an ambiguous entity, in accordance with some embodiments of the disclosure. For example, a media guidance application may instruction control circuitry 706 to execute the elements of process 1200.

Process 1200 begins at 1202, where the media guidance application receives (e.g., via control circuitry 706) a search query from a user. For example, the media guidance application may receive (e.g., via control circuitry 706) via a microphone (e.g., detector 112) a search query (e.g., search query 122) from a user. For example, the media guidance application may receive the search query "How old is he?"

Process 1200 continues to 1204, where the media guidance application determines (e.g., via control circuitry 706) whether the search query is a string. For example, as discussed above, the media guidance application may receive (e.g., via control circuitry 706) the search query via a microphone, in which case the search query is audio data. If the media guidance application determines (e.g., via control circuitry 706) that the search query is not a string (e.g., is audio data), process 1200 continues to 1206, where the media guidance application converts (e.g., via control circuitry 706) the search query to a string. For example, the media guidance application may use natural language processing (e.g., via control circuitry 706) to analyze the audio data to a string.

If the media guidance application determines (e.g., via control circuitry 706) that the search query is a string, or after converting the search query to a string at 1206, process 1200 continues to 1208, where the media guidance application parses (e.g., via control circuitry 706) the string into individual words. For example, the media guidance application may parse (e.g., via control circuitry 706) the string "How old is he?" into individual words "how," "old," "is," and "he" by detecting space characters in the string.

Process 1200 continues to 1210, where the media guidance application compares (e.g., via control circuitry 706) each individual word of the string, or combinations thereof, to a pronoun database. For example, the media guidance application may query (e.g., via control circuitry 706 over communications network 814) a database (e.g., media guidance data source 818) for a data structure indicating a plurality of pronouns. The media guidance application may receive (e.g., via control circuitry 706 over communications network) from the database (e.g., media guidance data source 818) the data structure indicating the plurality of pronouns. For example, the media guidance application may determine (e.g., via control circuitry 706) that the data structure contains the words "he," "she," "that," "this," "everyone," "they," "that guy," "those people," or any other suitable pronoun. The media guidance application may compare "how," "old," "is," and "he" to the words in the data structure indicating the plurality of pronouns. As another illustrative example, the media guidance application may receive (e.g., via control circuitry 706) the search query "How old is that guy at the altar?" The media guidance application may compare (e.g., via control circuitry 706), for example, the combination of "that" and "guy" to the pronoun database.

Process 1200 continues to 1212, where the media guidance application determines (e.g., via control circuitry 706) whether any individual word, or combinations thereof, matches an entry in the pronoun database. For example, if the search query was "How old is Jack Gleeson," the media guidance application may determine that none of the individual words "how," "old," "is," "Jack," nor "Gleeson" match the entries in the data structure indicating the plurality of pronouns. If the media guidance application determines (e.g., via control circuitry 706) that none of the individual words, or combinations thereof, match an entry in the pronoun database, process 1200 continues to 1214, where the media guidance application determines (e.g., via control circuitry 706) that the search query is not ambiguous. For example, the media guidance application may determine (e.g., via control circuitry 706) that the search query "How old is Jack Gleeson?" does not have an ambiguous entity, and rather an unambiguous entity (e.g., Jack Gleeson), and therefore is not ambiguous.

However, if the search query was "How old is he?", the media guidance application may determine that "he" matches the entry "he" in the pronoun database, or may determine (e.g., via control circuitry 706) that "that guy" matches the entry "that guy" in the pronoun database. If the media guidance application determines (e.g., via control circuitry 706) that one or more of the individual words, or combinations thereof, match a word in the pronoun database, process 1200 continues to 1216, where the media guidance application determines (e.g., via control circuitry 706) whether any of the individual words preceding the pronoun, or combinations thereof, are an unambiguous entity. For example, if the media guidance application receives (e.g., via control circuitry 706) the search query "Jack Gleeson, how old is he?," the media guidance application may determine that "he" matches a word in the pronoun database. At 1216, the media guidance application may determine (e.g., via control circuitry 706) that the individual words "Jack" and "Gleeson" make up an unambiguous entity. For example, the media guidance application may search (e.g., via control circuitry 706) a database (e.g., media guidance data source 818) for "Jack Gleeson" to determine that "Jack" and "Gleeson" make up an unambiguous entity.

If the media guidance application determines that any of the individual words preceding the pronoun, or combinations thereof, are an unambiguous entity, process 1200 continues to 1214, where the media guidance application determines (e.g., via control circuitry 706) that the search query is not ambiguous. For example, the media guidance application may determine (e.g., via control circuitry 706) that the search query "Jack Gleeson, how old is he?" does not have an ambiguous entity. The media guidance application may determine (e.g., via control circuitry 706) that the unambiguous entity "Jack Gleeson" disambiguates the ambiguous pronoun "he" in the search query, and therefore, that the search query is not ambiguous.

Returning to 1216, for example, the media guidance application may determine (e.g., via control circuitry 706) that none of the individual words preceding the pronoun, or combinations thereof, are an unambiguous entity. For example, the media guidance application may determine (e.g., via control circuitry 706) that the individual words in the search query "How old is he?", "how," "old," and "is," refer to an unambiguous entity by references by searching (e.g., via control circuitry 706) a database (e.g., media guidance data source 818) for "how," "old," and "is" to determine that none of the words preceding the pronoun correspond to an unambiguous entity. If the media guidance application determines (e.g., via control circuitry 706) none of the individual words preceding the pronoun, or combinations thereof, are an unambiguous entity, process 1200 continues to 1218, where the media guidance application determines (e.g., via control circuitry 706) that the search query is ambiguous. For example, the media guidance application may determine (e.g., via control circuitry 706) that the search query "How old is he?" is ambiguous.

The above-described embodiments of the present disclosure are presented for purposes of illustration and not of limitation, and the present disclosure is limited only by the claims that follow. Additionally, it should be noted that any of the devices or equipment discussed in relation to FIGS. 4-5 could be used to perform one or more of the steps in processes 900-1200 in FIGS. 9-12, respectively. Furthermore, it should be noted that the features and limitations described in any one embodiment may be applied to any other embodiment herein, and flowcharts or examples relating to one embodiment may be combined with any other embodiment in a suitable manner, done in different orders, performed with addition steps, performed with omitted steps, or done in parallel. For example, each of these steps may be performed in any order or in parallel or substantially simultaneously to reduce lag or increase the speed of the system or method. In addition, the systems and methods described herein may be performed in real time. It should also be noted that the systems and/or methods described above may be applied to, or used in accordance with, other systems and/or methods.

What is claimed is:

1. A method for disambiguating an ambiguous entity in a search query, the method comprising:
    identifying, using control circuitry, a gaze of a user relative to a display screen;
    determining, based on the gaze of the user, a first area of the display screen corresponding to the gaze of the user;
    receiving, from the user, a search query including a pronoun;
    determining that the search query includes an ambiguous entity;
    based on determining that the search query includes the ambiguous entity, identifying a frame of the media asset that corresponds to a playback position of the media asset;
    identifying a first location of a first entity in the frame and a second location of a second entity in the frame;
    determining that the first area overlaps with the first location and the second location;
    based on determining that the first area overlaps with the first location and the second location, retrieving metadata about the first entity and metadata about the second entity;
    determining, based on the metadata about the first entity and the metadata about the second entity, that the first entity is associated with the pronoun and the second entity is associated with a different pronoun; and
    based on determining that the first entity is associated with the pronoun and the second entity is associated with the different pronoun, generating for display a first prompt for additional input, wherein the first prompt for additional input indicates the first entity as a first potential disambiguation of the ambiguous entity in the search query.

2. The method of claim 1, further comprising:
    subsequent to generating for display the first prompt for additional input, receiving a negative input from the user, wherein the negative input indicates that the first entity is an incorrect disambiguation of the ambiguous entity in the search query;
    based on receiving the negative input:
        expanding the first area to a second area of the display screen, wherein the second area is larger than the first area;
        retrieving a third location of a third entity in the frame;
        determining that the second area overlaps with the third location;
        retrieving metadata about the third entity;
        determining, based on the metadata about the third entity, that the third entity is associated with the characteristic; and
        based on determining that the second area overlaps with the third location and on determining that the third entity is associated with the characteristic, generating for display a second prompt for additional input, wherein the second prompt for additional input indicates the third entity as a second potential disambiguation of the ambiguous entity in the search query.

3. The method of claim 2, wherein the frame is a first frame, the method further comprising:
    creating, using the control circuitry, a user profile for the user, wherein creating the user profile comprises:
        monitoring, using the control circuitry, the gaze of the user at a prior time;
        storing, in the user profile, data indicating a third area of the display screen corresponding to the gaze of the user at the prior time;
        determining a second frame of the media asset corresponding to the prior time;
        retrieving metadata relating to the second frame of the media asset, the metadata relating to the second frame indicating a fourth location of the first entity and a fifth location of a fourth entity;
        determining that the third area overlaps with the fourth location; and
        based on determining that the third area overlaps with the fourth location:
            storing, in the user profile, data indicating the first entity, the second frame, and the third area; and
            storing, in the user profile, a weighting profile, wherein the weighting profile assigns a first weight to the first entity, a second weight to the second entity, and a third weight to the third entity.

4. The method of claim 3, the method further comprising:
    based on receiving the negative input:
        retrieving, from the user profile, the metadata relating to the second frame and the third area;
        expanding the third area to a fourth area of the display screen, wherein the fourth area is larger than the third area;
        extracting the fifth location of the fourth entity from the metadata relating to the second frame;
        determining that the fourth area overlaps with the fifth location; and
        based on determining that the fourth area overlaps with the fifth location and that the second area overlaps with the second location, decreasing the first weight by a first amount, increasing the second weight by a second amount, and increasing the third weight by the second amount.

5. The method of claim 3, the method further comprising:
subsequent to generating for display the second prompt for additional input, receiving an affirmative input from the user, wherein the affirmative input indicates that the third entity is a correct disambiguation of the ambiguous entity in the search query;
based on receiving the affirmative input, decreasing the first weight by an amount and increasing the third weight by the amount.

6. The method of claim 3, wherein the metadata further includes a sixth location of the third entity in the first frame, the method further comprising:
extracting from the metadata the sixth location of the third entity in the first frame;
determining that the first area overlaps with the sixth location;
based on determining that the first area overlaps with the sixth location and the first location:
retrieving, from the user profile, the weighting profile;
extracting, from the weighting profile, the first weight and the third weight;
determining that the first weight is greater than the third weight; and
wherein generating for display the first prompt for additional input is further based on determining that the first weight is greater than the third weight.

7. The method of claim 2, further comprising:
retrieving a fourth location of a fourth entity in the frame;
determining that the first area overlaps with the fourth location;
based on determining that the first area overlaps with the fourth location and the first location:
retrieving, from the database, at least one of a user profile of the user, an indication of a social media popularity of the first entity and a social media popularity of the fourth entity, and a knowledge graph; and
wherein generating for display the first prompt for additional input is further based on the at least one of the user profile and the indication.

8. The method of claim 2, further comprising:
retrieving a fourth location of a fourth entity in the frame;
determining that the first area overlaps with the fourth location;
based on determining that the first area overlaps with the fourth location and the first location:
receiving, using the control circuitry, data indicative of a third area from a user device of a second user, wherein the third area was calculated based on a gaze of the second user at the current time;
determining that the third area overlaps with the location of the first entity; and
wherein generating for display the first prompt for additional input is further based on determining that the third area overlaps with the location of the first entity.

9. The method of claim 2, the method further comprising:
subsequent to generating for display the second prompt for additional input, receiving an affirmative input from the user, wherein the affirmative input indicates that the third entity is a correct disambiguation of the ambiguous entity in the search query;
based on receiving the affirmative input:
searching the database for media content that includes the third entity; and
generating for display listings for the media content that includes the third entity.

10. The method of claim 2, wherein the first entity, the second entity, and the third entity are at least one of an actor, an actress, an object, an animal, and a character.

11. A system for disambiguating an ambiguous entity in a search query, the system comprising:
memory; and
control circuitry configured to:
identify, a gaze of a user relative to a display screen;
determine, based on the gaze of the user, a first area of the display screen corresponding to the gaze of the user;
receive, form the user, a search query including a pronoun;
determine that the search query includes an ambiguous entity; and
based on determining that the search query includes the ambiguous entity, identify a frame of the media asset that corresponds to a playback position of the media asset;
identify a first location of a first entity in the frame and a second location of a second entity in the frame;
determine that the first area overlaps with the first location and the second location;
based on determining that the first area overlaps with the first location and the second location, retrieve metadata about the first entity and metadata about the second entity;
determine, based on the metadata about the first entity and the metadata about the second entity, that the first entity is associated with the pronoun and the second entity is associated with a different pronoun; and
based on determining that the first entity is associated with the pronoun and the second entity is associated with the different pronoun, generate for display a first prompt for additional input, wherein the first prompt for additional input indicates the first entity as a first potential disambiguation of the ambiguous entity in the search query.

12. The system of claim 11, wherein the control circuitry is further configured to:
subsequent to generating for display the first prompt for additional input, receive a negative input from the user, wherein the negative input indicates that the first entity is an incorrect disambiguation of the ambiguous entity in the search query;
based on receiving the negative input:
expand the first area to a second area of the display screen, wherein the second area is larger than the first area;
retrieve a third location of a third entity in the frame;
determine that the second area overlaps with the third location;
retrieve metadata about the third entity;
determine, based on the metadata about the third entity, that the third entity is associated with the characteristic; and
based on determining that the second area overlaps with the second location and on determining that the third entity is associated with the characteristic, generate for display a second prompt for additional input, wherein the second prompt for additional input indicates the third entity as a second potential disambiguation of the ambiguous entity in the search query.

13. The system of claim 12, wherein the frame is a first frame, and wherein the control circuitry is further configured to:
create a user profile for the user, wherein the control circuitry is configured to create the user profile by:
monitoring the gaze of the user at a prior time;
storing, in the user profile, data indicating a third area of the display screen corresponding to the gaze of the user at the prior time;
determining a second frame of the media asset corresponding to the prior time;
retrieving metadata relating to the second frame of the media asset, the metadata relating to the second frame indicating a fourth location of the first entity and a fifth location of a fourth entity;
determining that the third area overlaps with the fourth location; and
based on determining that the third area overlaps with the fourth location:
storing, in the user profile, data indicating the first entity, the second frame, and the third area; and
storing, in the user profile, a weighting profile, wherein the weighting profile assigns a first weight to the first entity, a second weight to the second entity, and a third weight to the third entity.

14. The system of claim 13, wherein the control circuitry, based on receiving the negative input, is further configured to:
retrieve, from the user profile, the metadata relating to the second frame and the third area;
expand the third area to a fourth area of the display screen, wherein the fourth area is larger than the third area;
extract the fifth location of the fourth entity from the metadata relating to the second frame;
determine that the fourth area overlaps with the fifth location; and
based on determining that the fourth area overlaps with the fifth location and that the second area overlaps with the second location, decrease the first weight by a first amount, increase the second weight by a second amount, and increase the third weight by the second amount.

15. The system of claim 13, wherein the control circuitry is further configured to:
receive, subsequent to generating for display the second prompt for additional input, an affirmative input from the user, wherein the affirmative input indicates that the third entity is a correct disambiguation of the ambiguous entity in the search query;
based on receiving the affirmative input, decrease the first weight by an amount and increase the third weight by the amount.

16. The system of claim 13, wherein the metadata further includes a sixth location of the third entity in the first frame, and wherein the control circuitry is further configured to:
extract from the metadata the sixth location of the third entity in the first frame;
determine that the first area overlaps with the sixth location;
based on determining that the first area overlaps with the sixth location and the first location:
retrieve, from the user profile, the weighting profile;
extract, from the weighting profile, the first weight and the third weight;
determine that the first weight is greater than the third weight; and
generate for display the first prompt for additional input based on determining that the first weight is greater than the third weight.

17. The system of claim 12, wherein the control circuitry is further configured to:
retrieve a fourth location of a fourth entity in the frame;
determine that the first area overlaps with the fourth location;
based on determining that the first area overlaps with the fourth location and the first location:
retrieve, from the database, at least one of a user profile of the user, an indication of a social media popularity of the first entity and a social media popularity of the fourth entity, and a knowledge graph; and
generate for display the first prompt for additional input based on the at least one of the user profile and the indication.

18. The system of claim 12, wherein the control circuitry is further configured to:
retrieve a fourth location of a fourth entity in the frame;
determine that the first area overlaps with the fourth location;
based on determining that the first area overlaps with the fourth location and the first location:
receive data indicative of a third area from a user device of a second user, wherein the third area was calculated based on a gaze of the second user at the current time;
determine that the third area overlaps with the location of the first entity; and
generate for display the first prompt for additional input based on determining that the third area overlaps with the location of the first entity.

19. The system of claim 12, wherein the control circuitry is further configured to:
receive, subsequent to generating for display the second prompt for additional input, an affirmative input from the user, wherein the affirmative input indicates that the third entity is a correct disambiguation of the ambiguous entity in the search query;
based on receiving the affirmative input:
search the database for media content that includes the third entity; and
generate for display listings for the media content that includes the third entity.

20. The system of claim 12, wherein the first entity, the second entity, and the third entity are at least one of an actor, an actress, an object, an animal, and a character.

* * * * *